US010332323B2

(12) United States Patent
Winiecki

(10) Patent No.: US 10,332,323 B2
(45) Date of Patent: Jun. 25, 2019

(54) AUTOMOTIVE PREDICTIVE FAILURE SYSTEM

(71) Applicant: Kenneth Carl Steffen Winiecki, Cupertino, CA (US)

(72) Inventor: Kenneth Carl Steffen Winiecki, Cupertino, CA (US)

( * ) Notice: Subject to any disclaimer, the term of this patent is extended or adjusted under 35 U.S.C. 154(b) by 0 days.

(21) Appl. No.: 16/148,868

(22) Filed: Oct. 1, 2018

(65) Prior Publication Data

US 2019/0035176 A1 Jan. 31, 2019

Related U.S. Application Data

(63) Continuation-in-part of application No. 15/236,245, filed on Aug. 12, 2016, now Pat. No. 10,121,292.

(60) Provisional application No. 62/204,208, filed on Aug. 12, 2015.

(51) Int. Cl.

| | |
|---|---|
| ***G05B 23/02*** | (2006.01) |
| ***G07C 5/00*** | (2006.01) |
| ***G07C 5/08*** | (2006.01) |

(52) U.S. Cl.

CPC ........... *G07C 5/0808* (2013.01); *G07C 5/006* (2013.01); *G07C 5/008* (2013.01); *G07C 5/085* (2013.01)

(58) Field of Classification Search

CPC .... G05B 23/0283; G07C 5/006; G07C 5/008; H04L 67/12

See application file for complete search history.

(56) References Cited

U.S. PATENT DOCUMENTS

| | | | | |
|---|---|---|---|---|
| 8,924,071 | B2 * | 12/2014 | Stanek ................ | G07C 5/0816 701/31.4 |
| 2004/0167689 | A1 * | 8/2004 | Bromley ............... | G07C 5/008 701/29.6 |
| 2006/0178792 | A1 * | 8/2006 | Ortiz .................. | B60R 16/0234 701/29.1 |
| 2016/0217627 | A1 * | 7/2016 | Khalaschi ........... | G07C 5/0808 |

* cited by examiner

*Primary Examiner* — Anshul Sood

(57) ABSTRACT

A method of predicting failure for vehicular components is implemented within a vehicle through a plurality of part sensors and an on-board computing (OBC) device as the part sensors are communicably coupled with the OBC device. The OBC device continuously timestamps and uploads a plurality of performance time-dependent data (PTDD) points to the OBC device throughout a current vehicular trip. The OBC device then analyzes the uploaded PTDD points with an updatable total time duration and an active performance-define range that are calculated from prior vehicular trips. The OBC device is then able to identify a potential vehicular problem during the current trip, based upon the uploaded PTDD points. When a potential vehicular problem is detected within the current trip, an annotating assessment is generated and wirelessly sent to a personal computing device of the owner/operator of the vehicle.

32 Claims, 30 Drawing Sheets

AUTOMOTIVE PREDICTIVE FAILURE SYSTEM

The current application is a continuation-in-part (CIP) application of a U.S. non-provisional application Ser. No. 15/236,245 filed on Aug. 12, 2016. The U.S. non-provisional application Ser. No. 15/236,245 claims a priority to a U.S. provisional application Ser. No. 62/204,208 filed on Aug. 12, 2015.

FIELD OF THE INVENTION

The present invention relates generally to the field of vehicles of motion, such as submersibles, tanks, helicopters, drones, space ships, rockets, cars, and autonomous cars, diagnostics. More specifically, the present invention is an automotive predictive failure and alerting system for vehicular parts.

BACKGROUND OF THE INVENTION

Automotive diagnostics allow the owner/driver of a vehicle to identify defect or degraded performance of a vehicular component if the vehicle is not able to maximize its performance efficiently. Majority of the automotive problems are normally identified by trained-automotive technicians as they perform a pass/fail test automotive diagnostics test. Only a handful of automotive problems can be identified by the owner/driver who is not a trained-automotive technician. For example, if the vehicular user interface specifically indicates the automotive problem, the problem can be easily identified without having to perform further testing. However, if the vehicular user interface does not indicate any automotive problem or indicates a general warning, further testing has to be performed by the trained-automotive technicians detect the exact problem. Since many of the automotive problems are not immediately identified or detected by the owner/driver, the current vehicular diagnostic system does not provide the most efficient process. Additionally, the owner/driver or trained-automotive technicians are not able to statistically forecast vehicular component failure in advance. As a result, many owners/drivers face unexpected vehicular breakdown that creates unproductive and unsafe circumstances.

It is an object of the present invention to introduce an automotive predictive failure and alerting system for vehicular parts so that the present invention is able to addresses the shortcomings of the prior problems. More specifically, the vehicular sensors continuously report performance values to the engine control unit (ECU) as the ECU continuously transmits these performance values to an on-board computing (OBC) device. Then the OBC device is able to perform real-time calculations to detect any automotive performance variations and also to calculate a part-performance efficiency for each of vehicular components that is communicably coupled with one of vehicular sensors. The performance variations have the ability to detect small deviations from normal part performance, and check other sensors and correlate trip data to create part and vehicle profile patterns distinguishing between towing, racing, and driving uphill, etc. The OBC device then utilizes the part-performance efficiency to determine predictive failure for the respective vehicular part so that the owner/driver can be notified.

DETAIL DESCRIPTIONS OF THE INVENTION

All illustrations of the drawings are for the purpose of describing selected versions of the present invention and are not intended to limit the scope of the present invention.

The present invention is a method of determining a predictive failure for vehicular part and alerting the respective parties about the failing vehicular parts. In order for the present invention to take place, a vehicle that includes a plurality of part sensors and an on-board computing (OBC) device and a personal computing device that is associated with an owner/operator of the vehicle are needed to be communicably couple with at least one OBC device. In reference to FIG. 1-4, each part sensor is communicably coupled with the OBC device (step A) so that the present invention is able collect raw data elements through the part sensors and the OBC device. More specifically, each part sensor collects raw data while the collected raw data is transmitted to the OBC device. Then, the OBC device is able to conduct necessary calculations and analyses to conclude and predict behavioral characteristics of the part sensors. At any given time, if the OBC device identifies a potential vehicular problem, the OBC device simultaneously notifies the personal computing device about the potential vehicular problem as an email, a text message, or an audio file. As a result, the owner/operator is immediately able to take necessary precautions for the potential vehicular problem. The overall process of the present invention is executed around a primary dataset and a secondary dataset for each part sensor. More specifically, the primary dataset and the secondary dataset are provided for each after-initial trip completed by the vehicle (step B) so that the overall process of the present invention can be executed.

Figure 1:
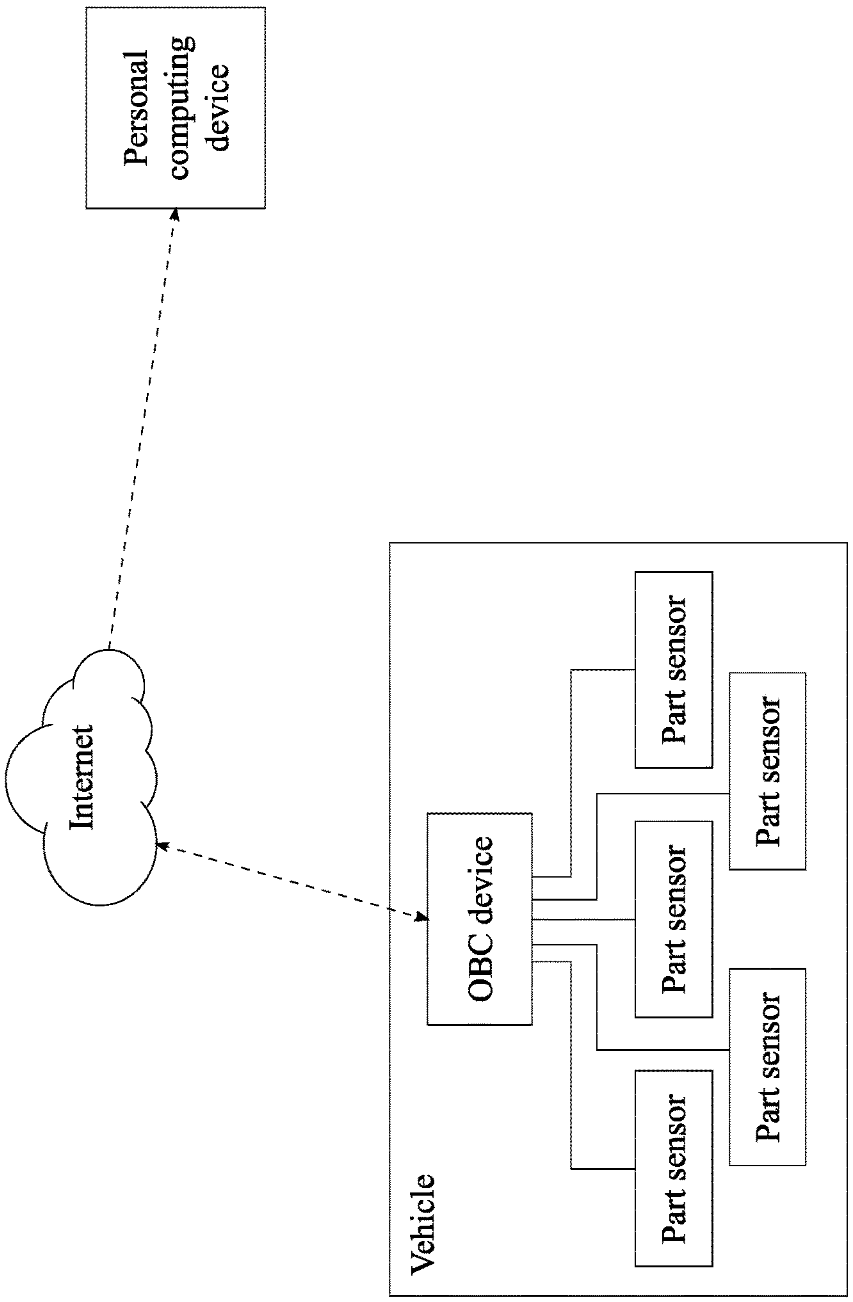
FIG. 1 is a basic view of the network diagram of the present invention.
Figure 2:
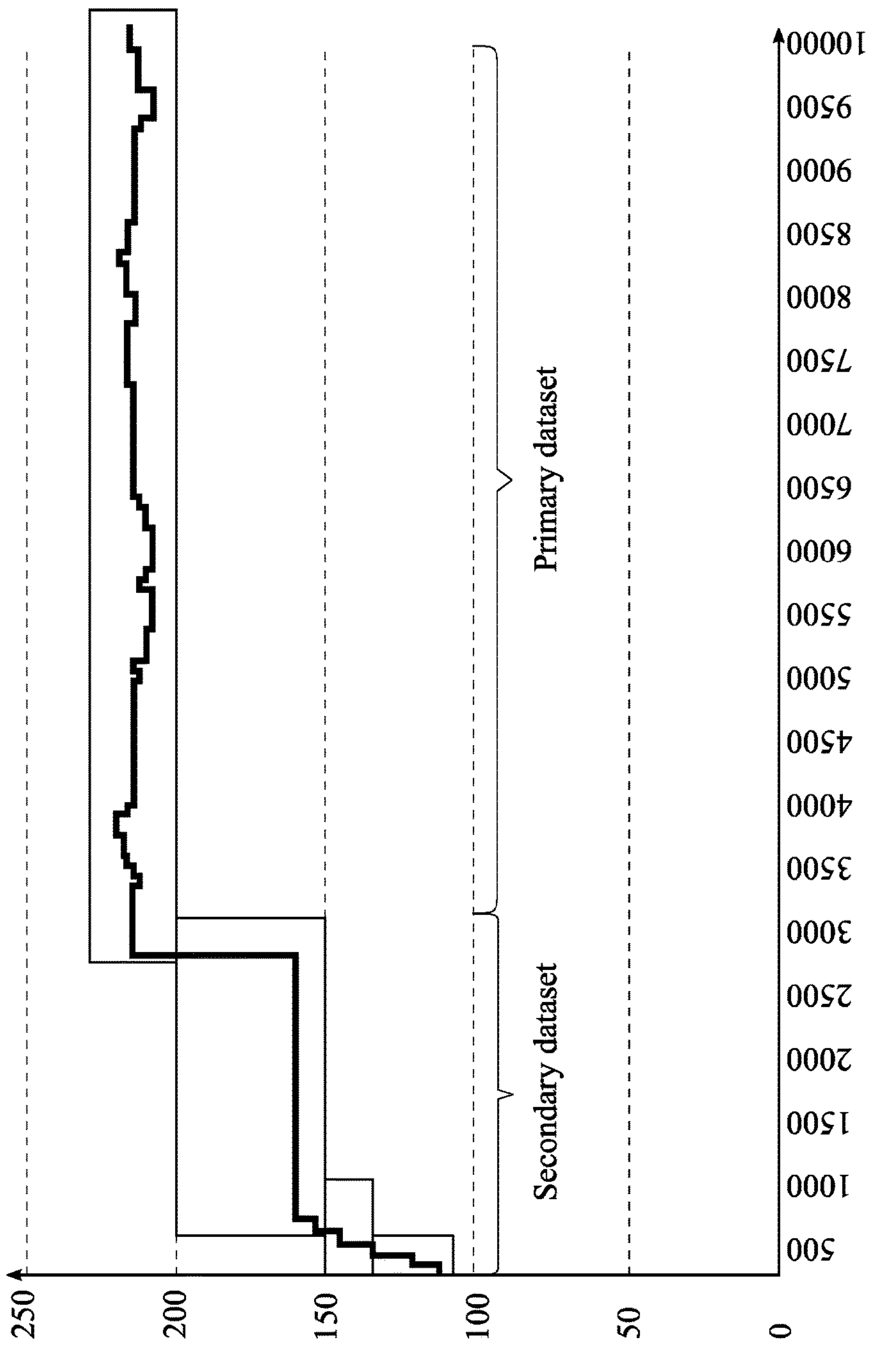
FIG. 2 is an exemplary view of the vehicle part performance pattern showing the secondary dataset and the primary dataset.
Figure 3:
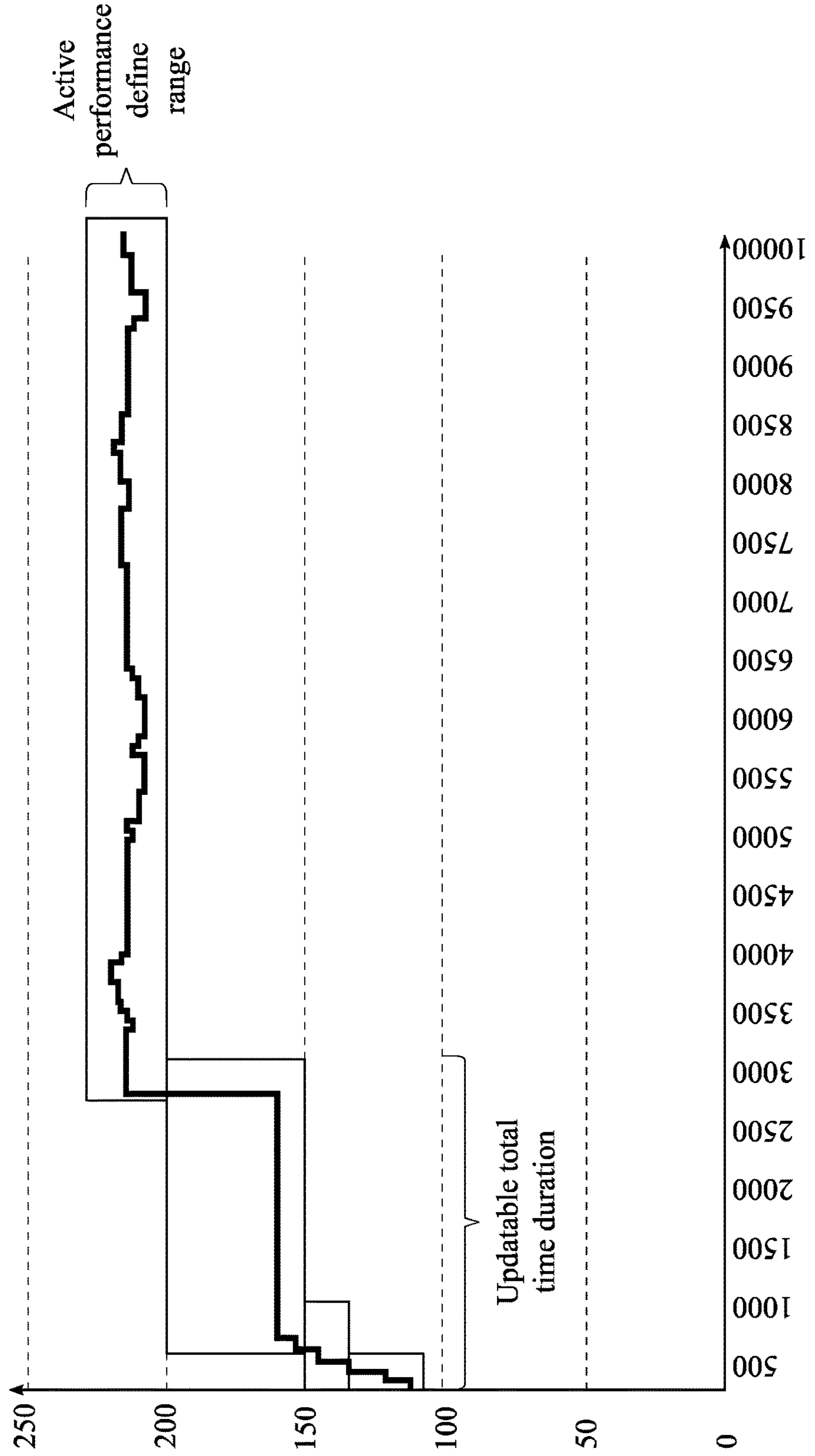
FIG. 3 is a, exemplary view of the vehicle part performance pattern showing the updatable total time duration of the secondary dataset and the active performance-define range of the primary dataset.
Figure 4:
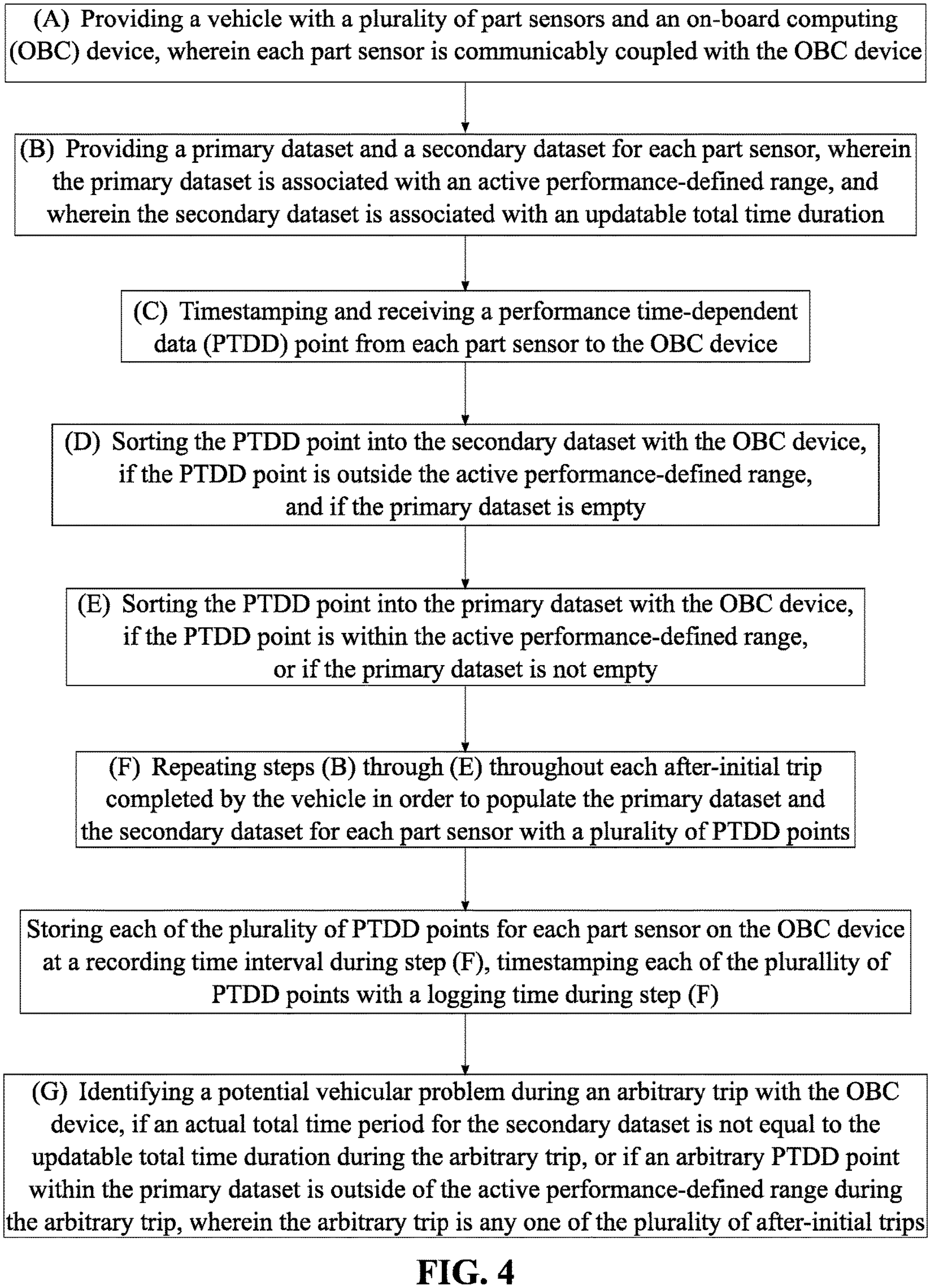
FIG. 4 is a flow chart that illustrates the overall process of the present invention.
Figure 5:
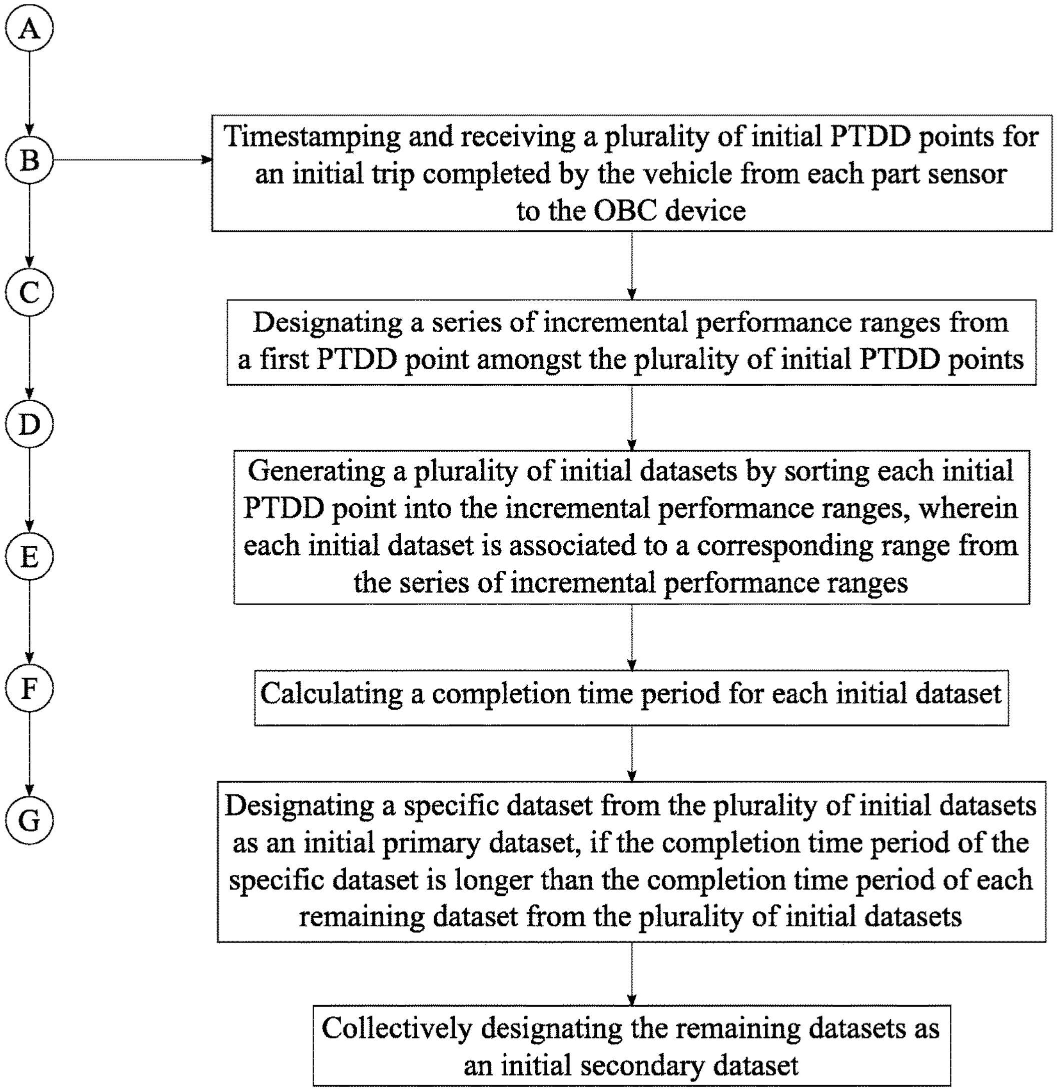
FIG. 5 is a flow chart that illustrates the designation of the initial secondary and initial primary dataset from the initial trip, within the overall process of the present invention.

In reference to FIG. 4-5, when the vehicle begins the initial trip, the OBC device timestamps and receives a plurality of initial performance time-dependent data (PTDD) points from each part sensor for the duration of the initial trip. Once a first PTDD point amongst the plurality of initial PTDD points is timestamped and received into the OBD device, the present invention designates a series of incremental performance ranges from the first PTDD point amongst the plurality of initial PTDD points. The series of incremental performance ranges are calculated with a predefined percentage, wherein the predefined percentage can be adjusted to obtain precise results from the present invention. For example, when the first PTDD point amongst the plurality of initial PTDD points is 100 and the predefined percentage is 10%, the series of incremental performance ranges become 100-110, 111-120, 121-130, 131-140, and so forth. Once the present invention determines that a last PTDD point amongst the plurality of initial PTDD points is received, the present invention sorts each initial PTDD point into the incremental performance ranges to generate a plurality of initial datasets. More specifically, each initial dataset is associated to a corresponding range from the series of incremental performance range. Then, a completion time period for each initial dataset is calculated within the OBC device in order to identify an initial primary dataset and an initial secondary dataset. In other words, the present invention designates a specific dataset from the plurality of initial datasets as the initial primary dataset if the completion time period of the specific dataset is longer than the completion time period of each remaining dataset from the plurality of initial datasets. Once the initial primary dataset is designated, the present invention collectively designates the remaining datasets from the plurality of initial datasets as an initial secondary dataset.

Figure 6:
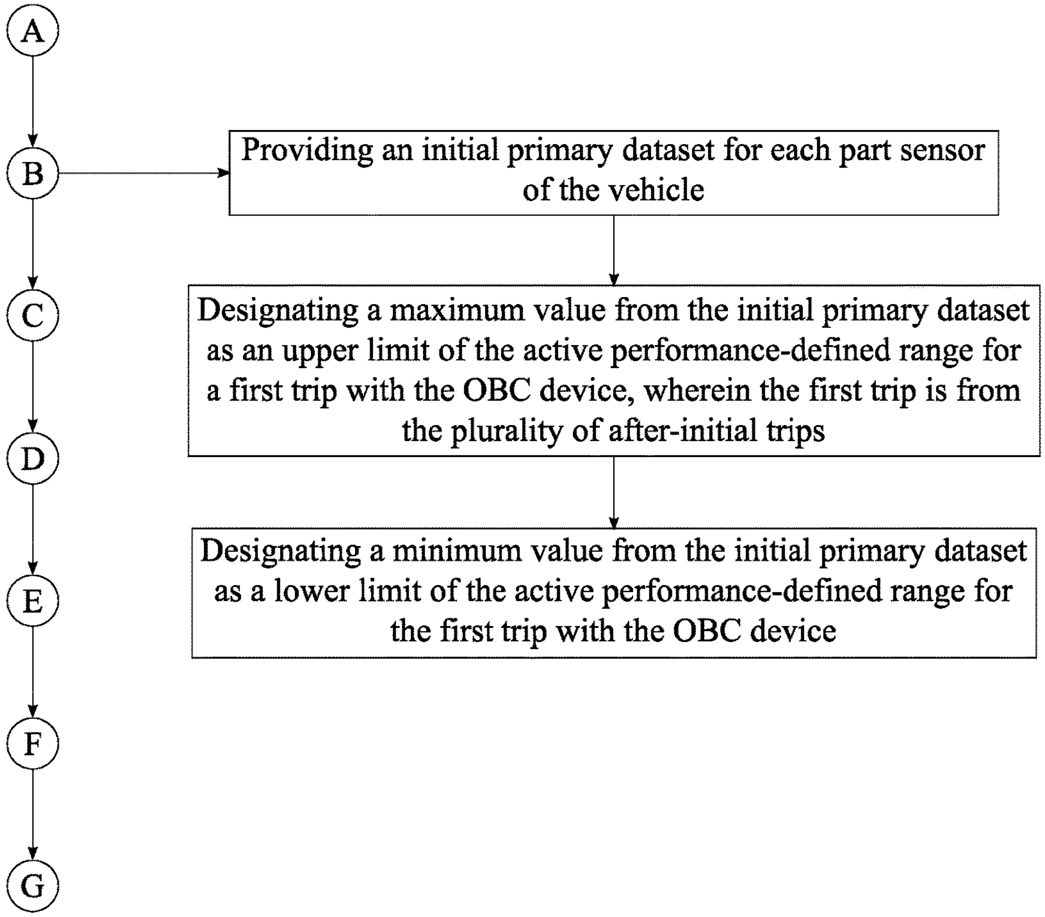
FIG. 6 is a flow chart that illustrates the designation of the active performance-define range for the first trip, within the overall process of the present invention.
Figure 8:
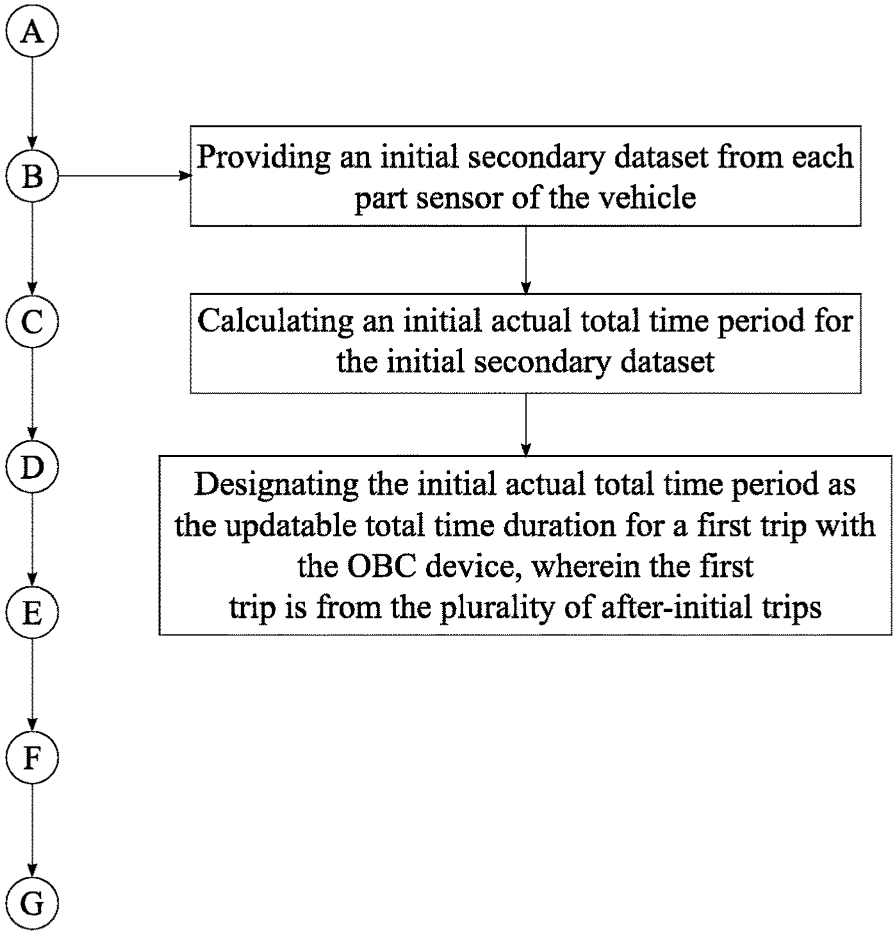
FIG. 8 is a flow chart that illustrates the designation of the updatable total time duration for the first trip, within the overall process of the present invention.

In order for the next phase of the present invention to be utilized, the present invention needs to designate an active performance-defined range that is associated with the primary dataset and an updatable total time duration that is associated with the secondary dataset for a first trip, wherein the first trip is from the plurality of after-initial trips. In reference to FIG. 4, FIG. 6, and FIG. 8, the present invention designates a maximum value from the initial primary dataset as an upper limit of the active performance-defined range for the first trip with the OBC device. The present invention also designates a minimum value from the initial primary dataset as a lower limit of the active performance-defined range for the first trip with the OBC device. As a result, the primary dataset and the active performance-defined range for the first trip can be concluded within the overall process of the present invention. Simultaneously, the present invention calculates an initial actual total time period for the initial secondary dataset. Then, the initial actual total time period is designated as the updatable total time duration for the first trip with the OBC device.

The first trip or any other after-initial trip that is in progress within the present invention is defined as an arbitrary trip hereinafter. In reference to FIG. 4, when the vehicle begins the arbitrary trip, the OBC device timestamps and receives a PTDD point from each part sensor to the OBC device (step C) so that the PTDD point can be sorted into the secondary dataset or the primary dataset of the first trip. More specifically, when the OBC device receives the PTDD point to the OBC device, the PTDD point is sorted into the secondary dataset with the OBC device if the PTDD point is outside the active performance-defined range of the arbitrary trip and if the primary dataset of the arbitrary trip is empty (step D). When the OBC device receives the PTDD point to the OBC device, the PTDD point is sorted into the primary dataset with the OBC device if the PTDD point is within the active performance-defined range of the arbitrary trip or if the primary dataset of the arbitrary trip is not empty (step E).

In reference to FIG. 4, the present invention then repeats (step B) through (step E) throughout each after-initial trip completed by the vehicle in order to populate the primary dataset and the secondary dataset for each part sensor with a plurality of PTDD points (step F). More specifically, each of the plurality of PTDD points for each part sensor is stored on the OBC device at a recording time interval so that each of the plurality of PTDD points is timestamped with a logging time, which is utilized for further calculations within the present invention. As a result, the present invention is able to implement a real time data processing system through the OBC device.

Figure 7:
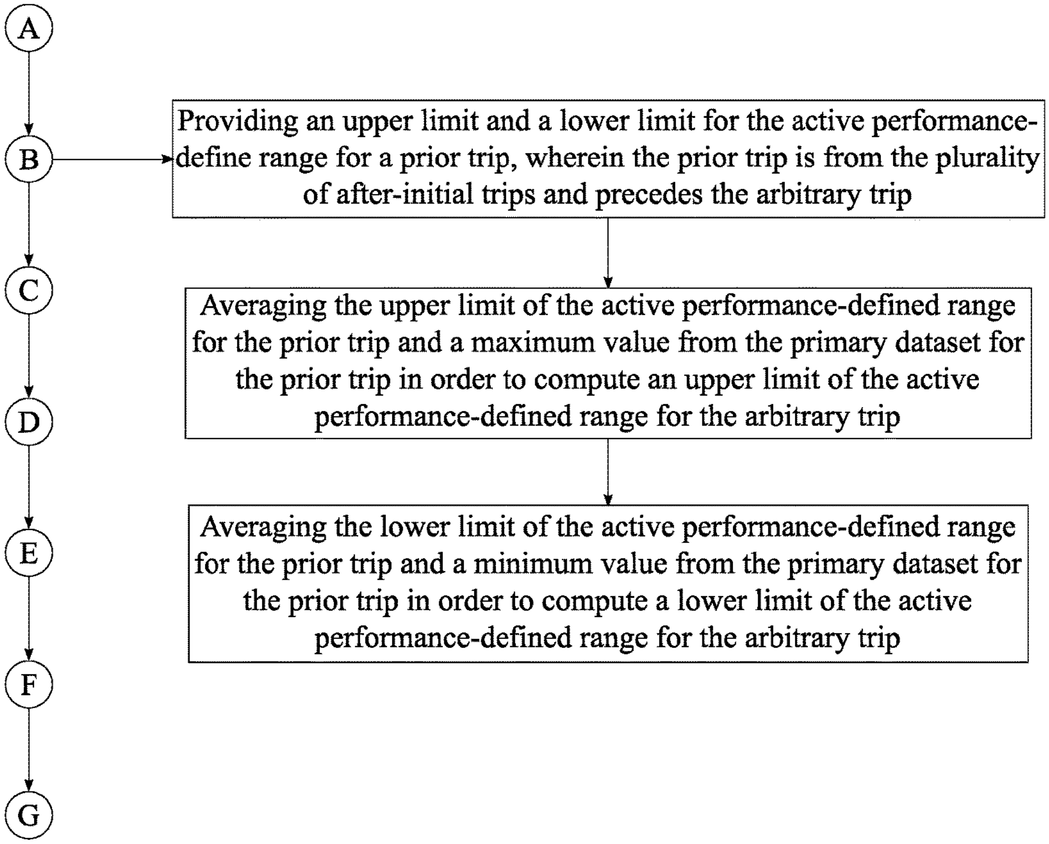
FIG. 7 is a flow chart that illustrates the designation of the active performance-define range for the arbitrary trip, within the overall process of the present invention.
Figure 9:
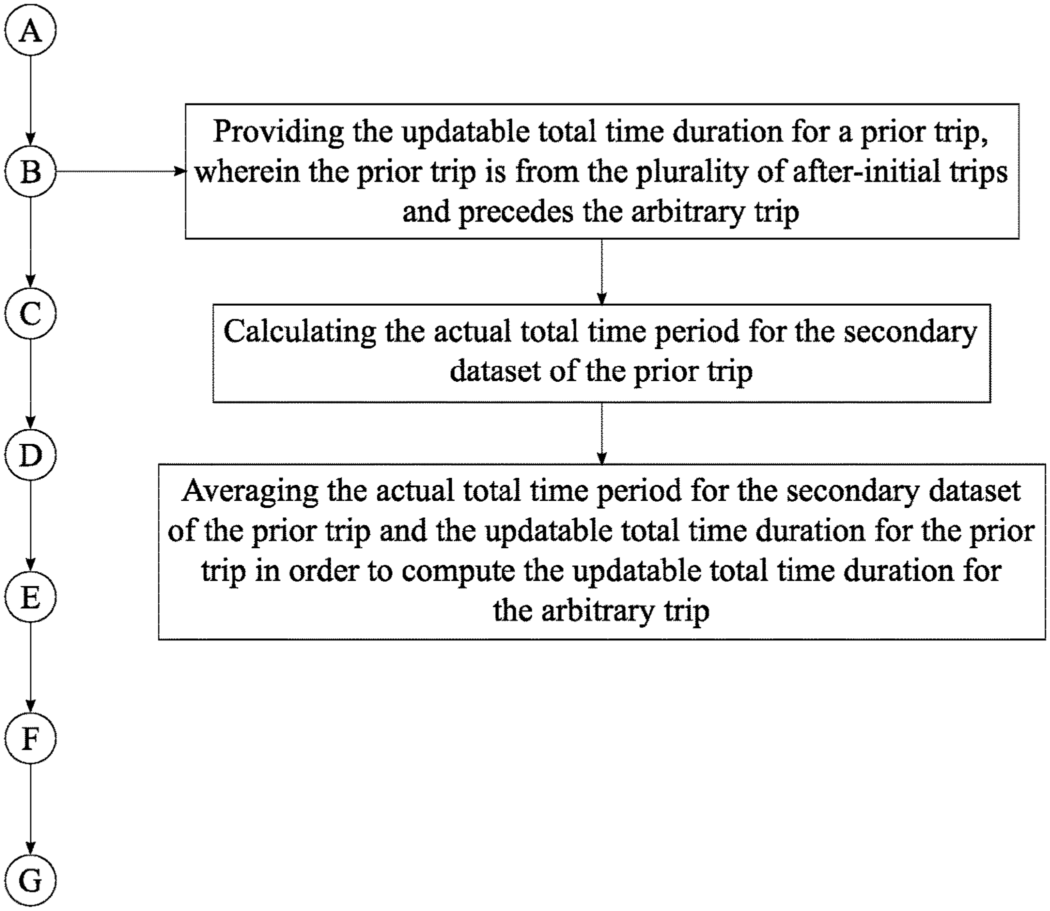
FIG. 9 is a flow chart that illustrates the designation of the updatable total time duration for the arbitrary trip, within the overall process of the present invention.

The present invention then repeats (step B) through (step F) for a plurality of arbitrary trips in order to further narrow the active performance-defined range and the updatable total time duration for the arbitrary trip from a prior trip, wherein the prior trip is from the plurality of after-initial trips and precedes the arbitrary trip. In order to further narrow the active performance-defined range for the arbitrary trip as shown in FIG. 7, the present invention averages the upper limit of the active performance-defined range for a prior trip and a maximum value from the primary dataset for the prior trip so that an upper limit of the active performance-defined range for the arbitrary trip can be calculated. Similarly, the present invention averages the lower limit of the active performance-defined range for the prior trip and a minimum value from the primary dataset for the prior trip in order to compute a lower limit of the active performance-defined range for the arbitrary trip. In order to further narrow the updatable total time duration for the arbitrary trip as shown in FIG. 9, the present invention first calculates an actual total time period for the secondary dataset of the prior trip. Then, the actual total time period for the secondary dataset of the prior trip and the updatable total time duration for the prior trip are averaged together in order to compute the updatable total time duration for the arbitrary trip.

In reference to FIG. 4, the OBC device is able to identify the potential vehicular problem during an arbitrary trip with respect to the secondary dataset or the primary dataset of the arbitrary trip. Firstly, the present invention is able to identify the potential vehicular problem if the actual total time period for the secondary dataset is not equal to the updatable total time duration during the arbitrary trip (step G). Secondly, the present invention is able to identify the potential vehicular problem if an arbitrary PTDD point within the primary dataset is outside of the active performance-defined range during the arbitrary trip (step G).

Figure 10:
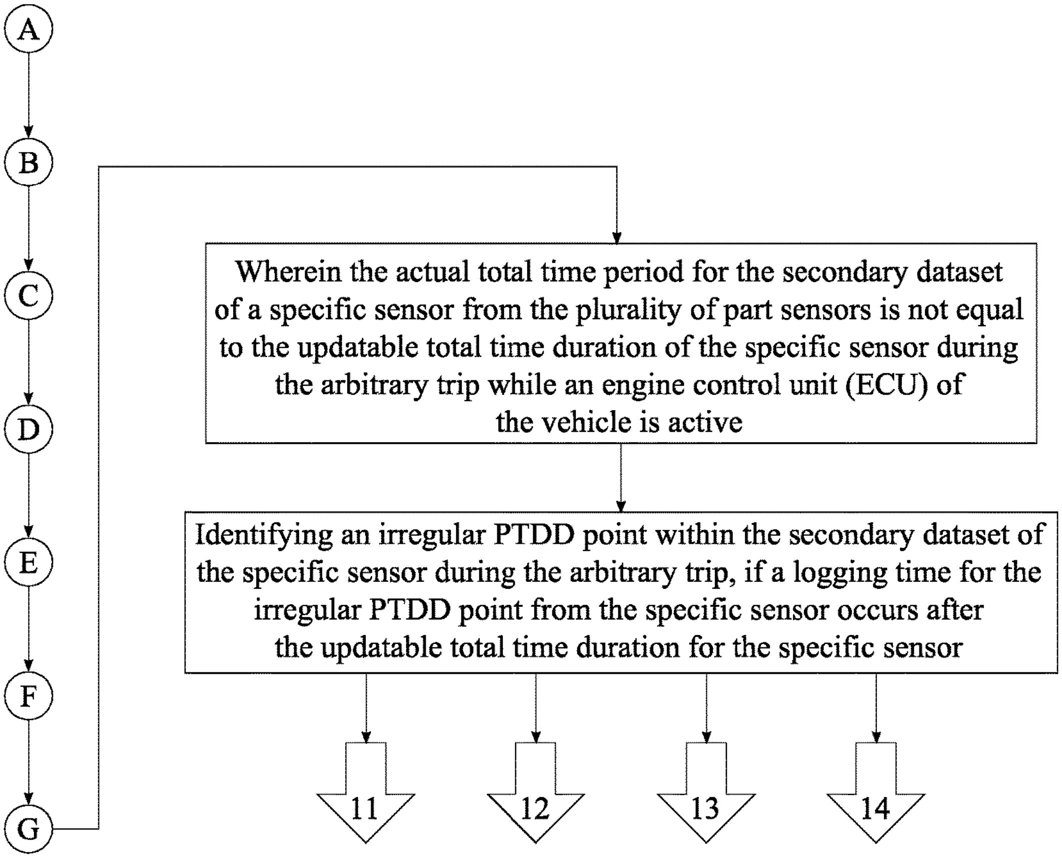
FIG. 10 is a flow chart that illustrates the identification of the potential vehicular problem when the actual total time period for the specific sensor is longer than the updatable total time duration during the arbitrary trip.
Figure 21:
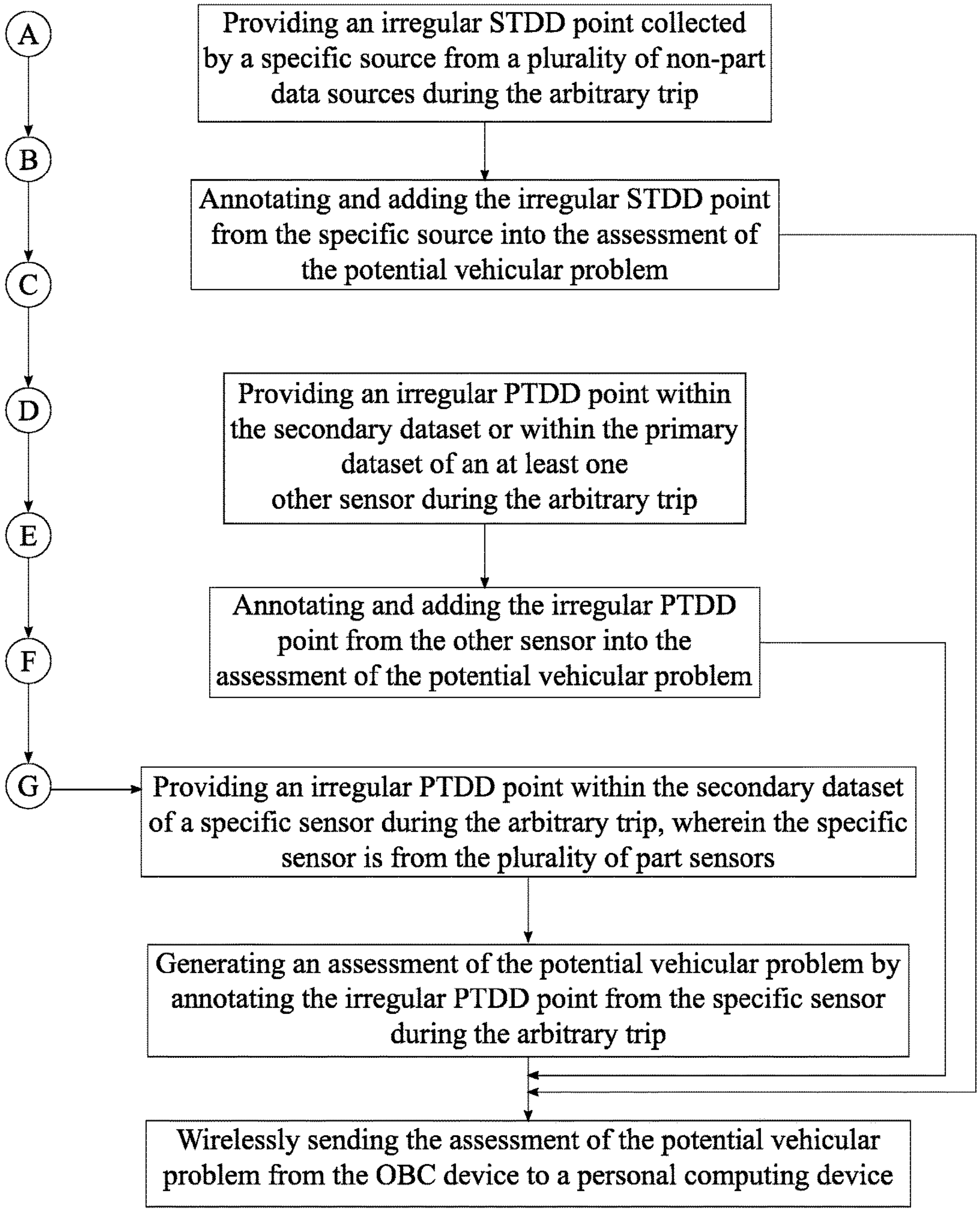
FIG. 21 is a flow chart that illustrates the generation of the assessment for the potential vehicular problem, wherein the irregular PTDD is associated with the secondary dataset.

In reference to FIG. 4, FIG. 10, and FIG. 21, the present invention detects the potential vehicular problem from a specific sensor of the plurality of part sensors if the actual total time period for the secondary dataset of the specific sensor is longer than the updatable total time duration of the specific sensor during the arbitrary trip while an engine control unit (ECU) of the vehicle is active. More specifically, the present invention identifies an irregular PTDD point within the secondary dataset of the specific sensor during the arbitrary trip. The present invention is then able to determine that the actual total time period for the secondary dataset of the specific sensor is longer than the updatable total time duration of the specific sensor, if the logging time for the irregular PTDD point from the specific sensor occurs after the updatable total time duration for the specific sensor. However, this only indicates that the specific sensor has the potential vehicular problem with the secondary dataset. In order to further narrow down the potential vehicular problem, the present invention then evaluates the plurality of part sensors excluding the specific sensor. If the present invention is not able to identify at least one other sensor from the plurality of sensors that performs out of norm, the present invention determines that only the specific sensor is at fault. An assessment of the potential vehicular problem is then generated by annotating the irregular PTDD from the specific sensor, wherein the assessment corresponds to the respective vehicular part. Once the assessment of the potential vehicular problem is generated for the actual total time period for the secondary dataset of the specific sensor being longer than the updatable total time duration of the specific sensor, the present invention wirelessly sends the assessment of the potential vehicular problem from the OBC device to the personal computing device.

Figure 11:
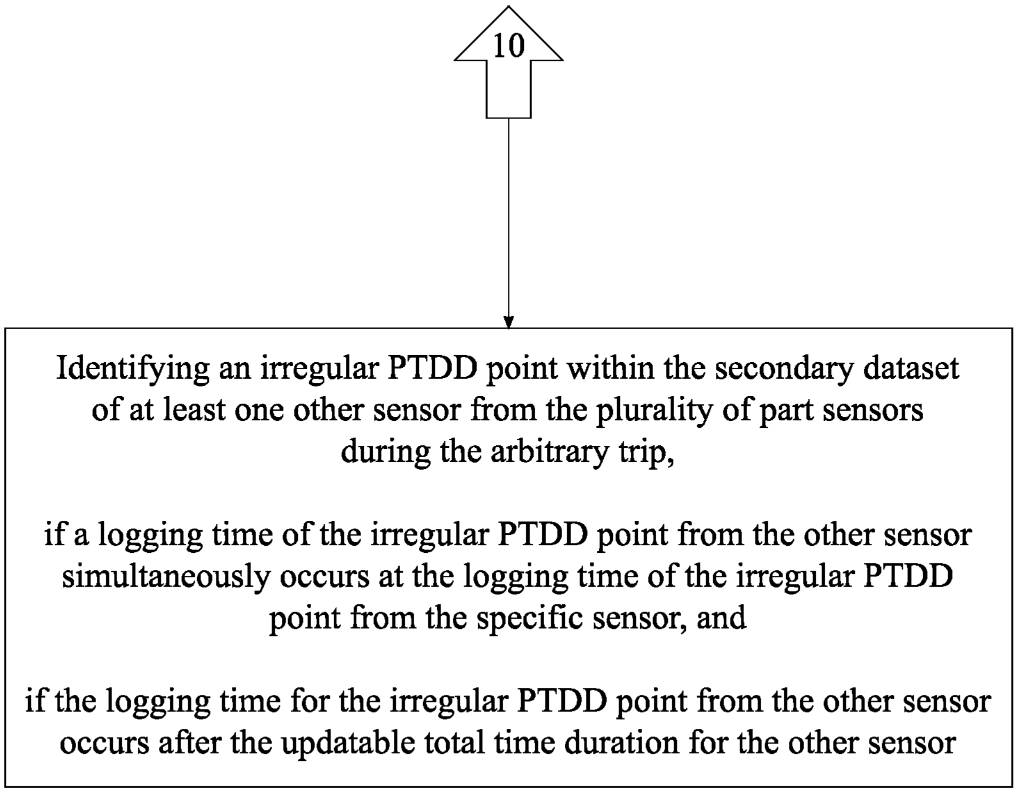
FIG. 11 is a flow chart that illustrates the identification of the potential vehicular problem when the actual total time period for the specific sensor is longer than the updatable total time duration during the arbitrary trip, and the actual total time period for the other sensor last longer than the updatable total time duration of the other sensor.

In reference to FIG. 10, FIG. 11, and FIG. 21, when the present invention identifies at least one other sensor from the plurality of sensors is performing out of norm, the present invention then determines that the out of norm performance of the other sensor is related to the actual total time period for the secondary dataset of the specific sensor to perform longer than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor and if the logging time for the irregular PTDD point from the other sensor occurs after the updatable total time duration for the other sensor.

As a result, the present invention determines that the actual total time period of the specific sensor performs longer than the updatable total time duration of the specific sensor due to the fact that the actual total time period of the other sensor is longer than the updatable total time duration of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being longer than the updatable total time duration of the specific sensor and the actual total time period of the other sensor being longer than the updatable total time duration of the other sensor, the present invention wirelessly sends the assessment of the potential vehicular problem from the OBC device to the personal computing device.

Figure 12:
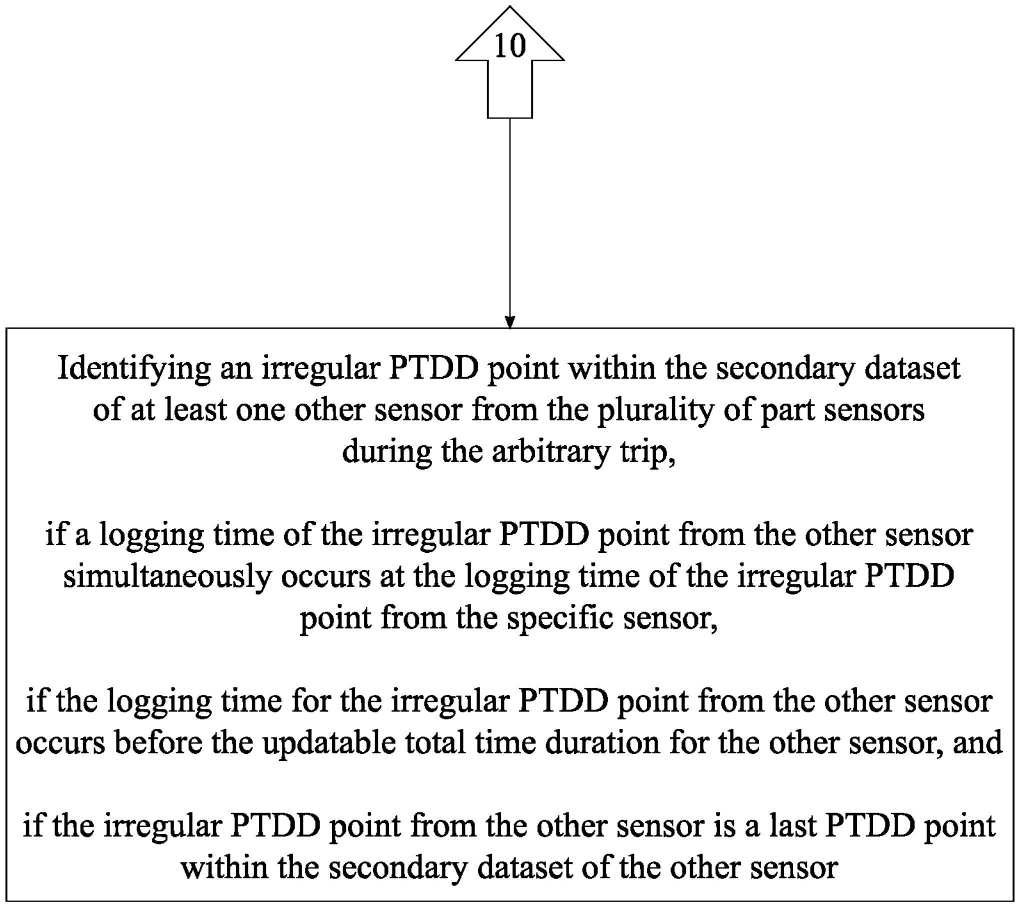
FIG. 12 is a flow chart that illustrates the identification of the potential vehicular problem when the actual total time period for the specific sensor is longer than the updatable total time duration during the arbitrary trip, and the actual total time period for the other sensor last shorter than the updatable total time duration of the other sensor.

In reference to FIG. 10, FIG. 12, and FIG. 21, when the present invention identifies at least one other sensor from the plurality of sensors is performing out of norm, the present invention then determines that the out of norm performance of the other sensor is related to the actual total time period for the secondary dataset of the specific sensor to perform longer than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor, if the logging time for the irregular PTDD point from the other sensor occurs before the updatable total time duration for the other sensor, and if the irregular PTDD point from the other sensor is a last PTDD point within the secondary dataset of the other sensor.

As a result, the present invention determines that the actual total time period of the specific sensor performs longer than the updatable total time duration of the specific sensor due to the fact that the actual total time period of the other sensor is shorter than the updatable total time duration of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being longer than the updatable total time duration of the specific sensor and the actual total time period of the other sensor being shorter than the updatable total time duration of the other sensor, the present invention wirelessly sends the assessment of the potential vehicular problem from the OBC device to the personal computing device.

Figure 13:
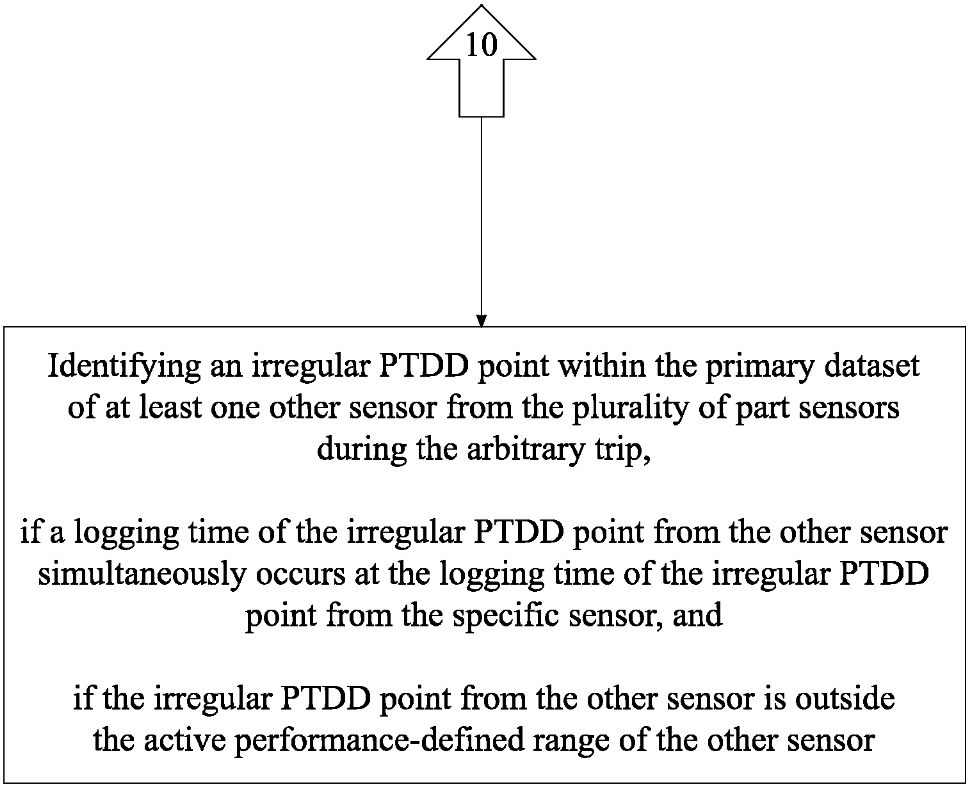
FIG. 13 is a flow chart that illustrates the identification of the potential vehicular problem when the actual total time period for the specific sensor is longer than the updatable total time duration during the arbitrary trip, and the primary dataset for the other sensor includes irregular PTDD point outside of the active performance-define range.

In reference to FIG. 10, FIG. 13, and FIG. 21, when the present invention identifies at least one other sensor from the plurality of sensors is performing out of norm, the present invention then determines that the out of norm performance of the other sensor is related to the actual total time period for the secondary dataset of the specific sensor to perform longer than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the primary dataset of the other sensor during the arbitrary trip if the logging time of the irregular PTDD point from the other sensor simultaneously occurs at the logging time of the irregular PTDD point from the specific sensor and if the logging time for the irregular PTDD point from the other sensor is outside the active performance-defined range of the other sensor.

As a result, the present invention determines that the actual total time period of the specific sensor performs longer than the updatable total time duration of the specific sensor due to the fact that the irregular PTDD point from the other sensor is identified outside the active performance-defined range of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being longer than the updatable total time duration of the specific sensor and the irregular PTDD point from the other sensor being outside the active performance-defined range of the other sensor, the present invention wirelessly sends the assessment of the potential vehicular problem from the OBC device to the personal computing device.

Figure 14:
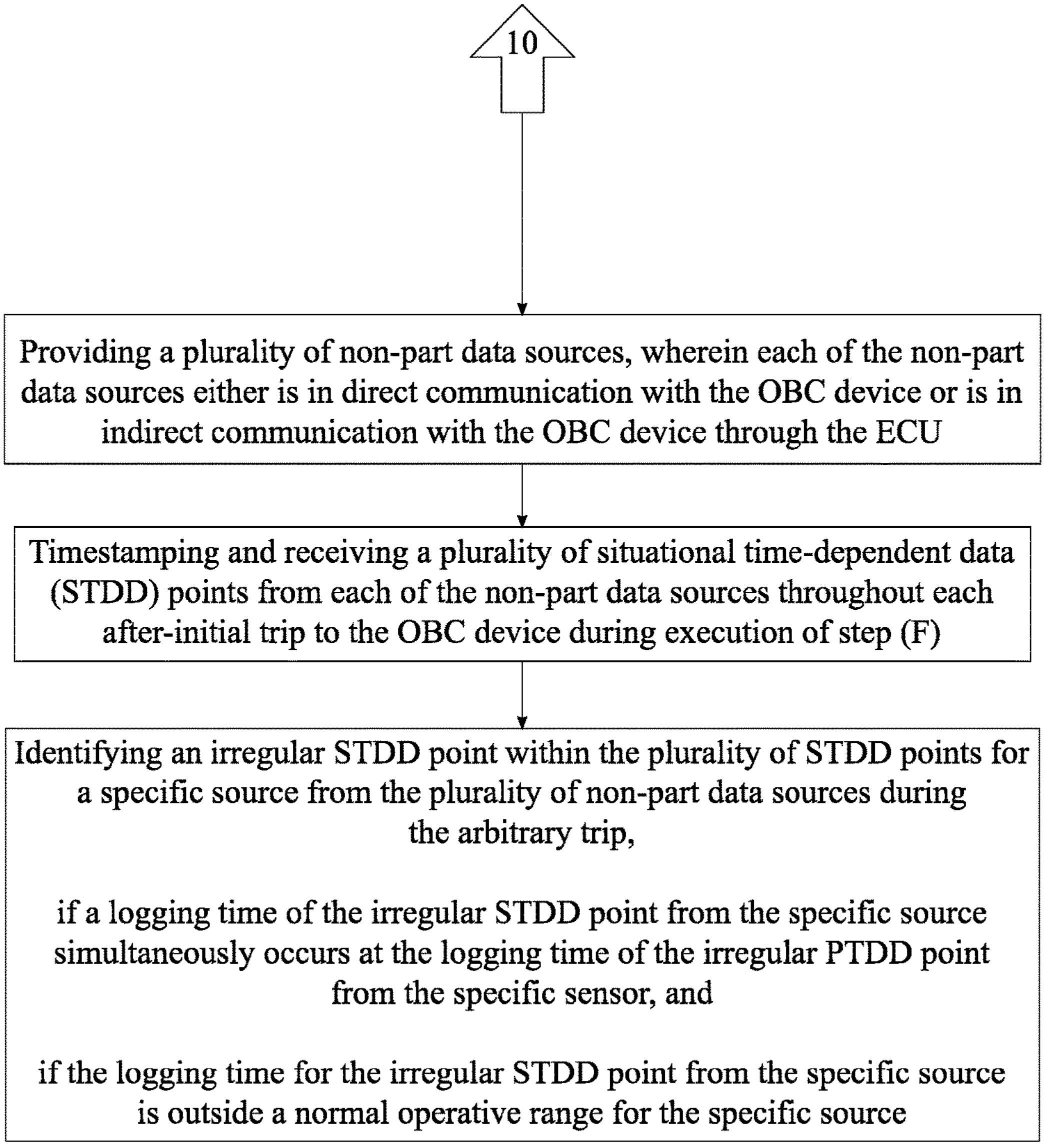
FIG. 14 is a flow chart that illustrates the identification of the potential vehicular problem when the actual total time period for the specific sensor is longer than the updatable total time duration during the arbitrary trip, and the irregular STDD point for the specific source is outside of the normal operative range.

In reference to FIG. 10, FIG. 14, and FIG. 21, the vehicle also includes a plurality of non-part data sources. For example, the plurality of non-part data sources includes, but is not limited, global positioning system (GPS) location, local weather and air temperature from a mobile network, a vehicle accelerometer coordination, throttle position, RPM of the engine, speed of the vehicle, a vehicle pitch coordination, a vehicle yaw coordination, and a vehicle roll coordination. Each of the non-part data sources either is in direct communication with the OBC device or is in indirect communication with the OBC device through the ECU. Similar to the plurality of PTDD points, the OBD device also timestamps and receives a plurality of situational time-dependent data (STDD) points from each of the non-part data sources to the OBC device during execution of step (F). When the present invention identifies identify at least one data source from the plurality of non-part data sources is performing out of norm, the present invention then determines that the out of norm performance of the data source is related to the actual total time period for the secondary dataset of the specific sensor to perform longer than the updatable total time duration of the specific sensor. As a result, the present invention determines that the specific sensor and the data source are at fault. More specifically, the present invention identifies the irregular PTDD point within the secondary dataset of the specific sensor during the arbitrary trip. The present invention then identifies an irregular STDD point within the plurality of STDD points for a specific source from the plurality of non-part data sources during the arbitrary trip if a logging time of the irregular STDD point from the specific source simultaneously occurs at the logging time of the irregular PTDD point from the specific sensor and if the logging time for the irregular STDD point from the specific source is outside a normal operative range for the specific source. The normal operative range for the specific source can be pre-defined within the OBC device in order to provide a standardized outcome from the present invention.

As a result, the present invention determines that the actual total time period of the specific sensor performs longer than the updatable total time duration of the specific sensor due to the fact that the irregular STDD point from the specific source is identified outside the normal operative range for the specific source. An assessment of the potential vehicular problem is then generated by annotating the irregular PTDD from the specific sensor. The present invention then annotates and adds the irregular STDD point from the specific source into the assessment of the potential vehicular problem, wherein the assessment corresponds to respective vehicular parts of the specific sensor and the specific source. Once the assessment of the potential vehicular problem is generated for the actual total time period of the specific sensor being longer than the updatable total time duration of the specific sensor and the irregular STDD point from the specific source being outside the normal operative range for the specific source, the present invention wirelessly sends the assessment of the potential vehicular problem from the OBC device to the personal computing device.

Figure 15:
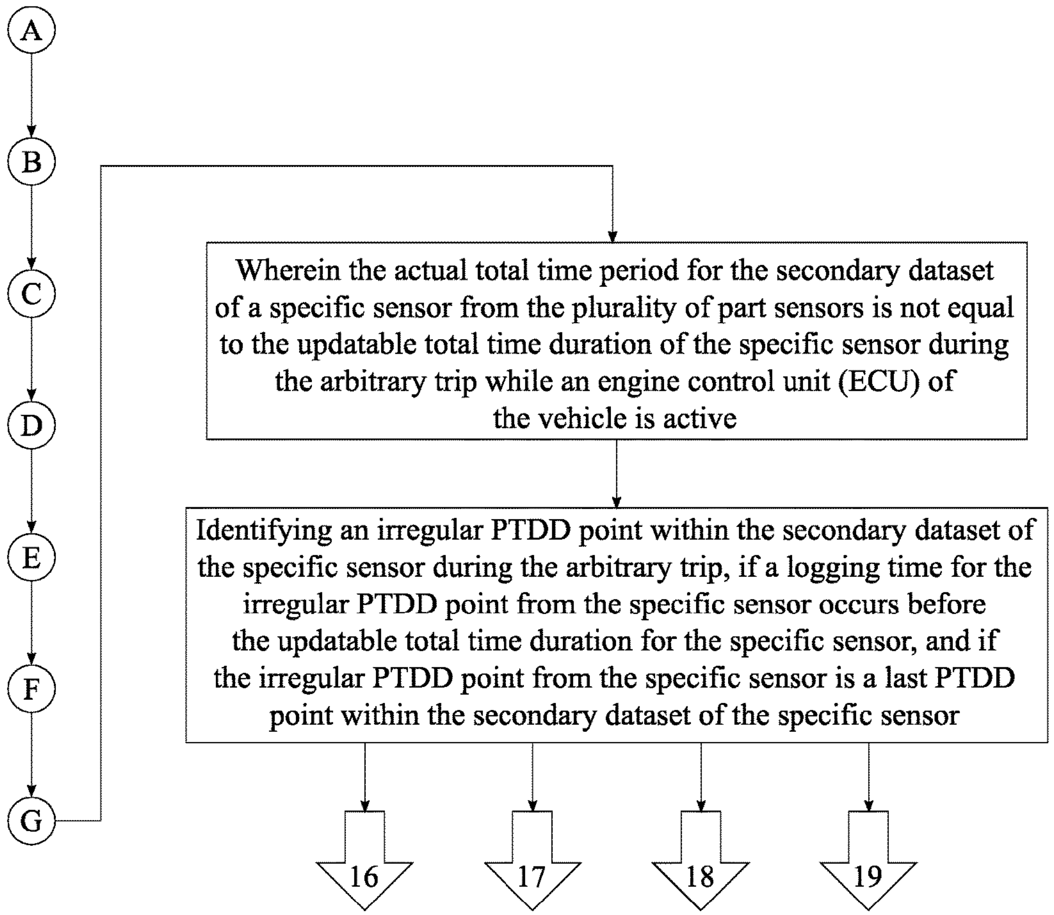
FIG. 15 is a flow chart that illustrates the identification of the potential vehicular problem when the actual total time period for the specific sensor is shorter than the updatable total time duration during the arbitrary trip.

In reference to FIG. 4, FIG. 15, and FIG. 21, the present invention detects the potential vehicular problem from a specific sensor of the plurality of part sensors if the actual total time period for the secondary dataset of the specific sensor is shorter than the updatable total time duration of the specific sensor during the arbitrary trip while the ECU of the vehicle is active. More specifically, the present invention identifies an irregular PTDD point within the secondary dataset of the specific sensor during the arbitrary trip. The present invention is then able to determine that the actual total time period for the secondary dataset of the specific sensor is shorter than the updatable total time duration of the specific sensor, if the logging time for the irregular PTDD point from the specific sensor occurs before the updatable total time duration for the specific sensor and if the irregular PTDD point from the specific sensor is a last PTDD point within the secondary dataset of the specific sensor. However, this only indicates that the specific sensor has the potential vehicular problem with the secondary dataset. In order to further narrow down the potential vehicular problem, the present invention then evaluates the plurality of part sensors excluding the specific sensor. If the present invention is not able to identify at least one other sensor from the plurality of sensors that performs out of norm, the present invention determines only the specific sensor is at fault. An assessment of the potential vehicular problem is then generated by annotating the irregular PTDD from the specific sensor, wherein the assessment corresponds to the respective vehicular part. Once the assessment of the potential vehicular problem is generated for the actual total time period for the secondary dataset of the specific sensor being shorter than the updatable total time duration of the specific sensor, the present invention wirelessly sends the assessment of the potential vehicular problem from the OBC device to the personal computing device.

Figure 16:
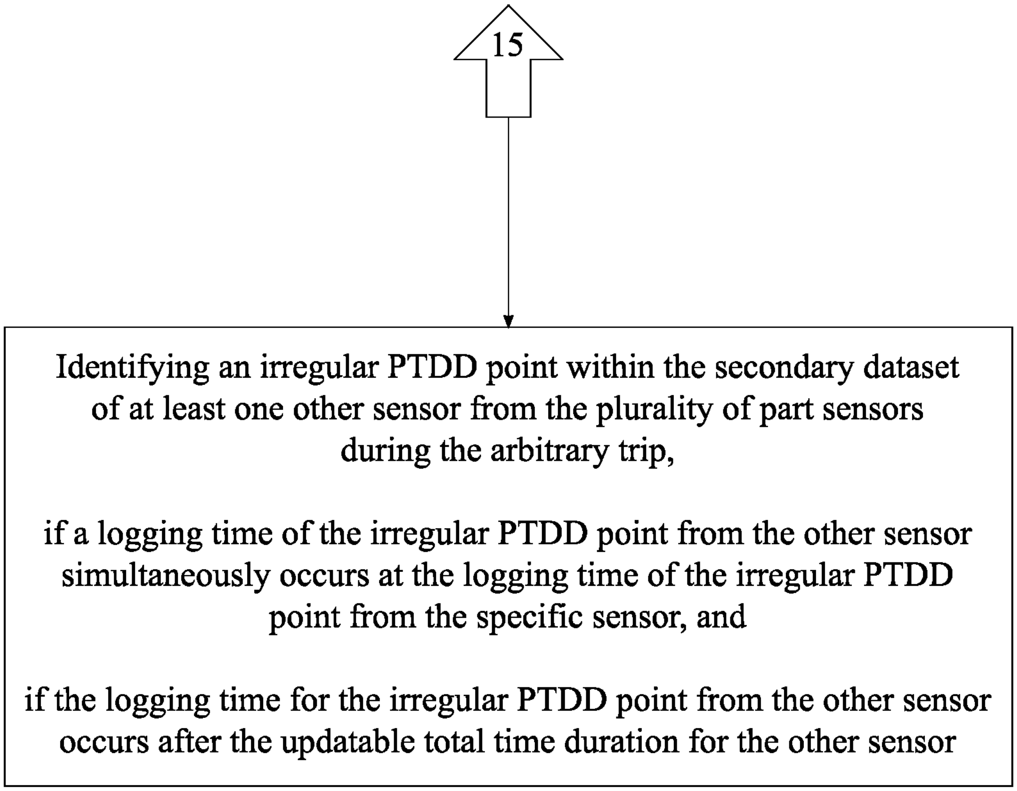
FIG. 16 is a flow chart that illustrates the identification of the potential vehicular problem when the actual total time period for the specific sensor is shorter than the updatable total time duration during the arbitrary trip, and the actual total time period for the other sensor last longer than the updatable total time duration of the other sensor.

In reference to FIG. 15, FIG. 16, and FIG. 21, when the present invention identifies at least one other sensor from the plurality of sensors is performing out of norm, the present invention then determines that the out of norm performance of the other sensor is related to the actual total time period for the secondary dataset of the specific sensor to perform shorter than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor, and if the logging time for the irregular PTDD point from the other sensor occurs after the updatable total time duration for the other sensor.

As a result, the present invention determines that the actual total time period of the specific sensor performs shorter than the updatable total time duration of the specific sensor due to the fact that the actual total time period of the other sensor is longer than the updatable total time duration of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being shorter than the updatable total time duration of the specific sensor and the actual total time period of the other sensor being longer than the updatable total time duration of the other sensor, the present invention wirelessly sends the assessment of the potential vehicular problem from the OBC device to the personal computing device.

Figure 17:
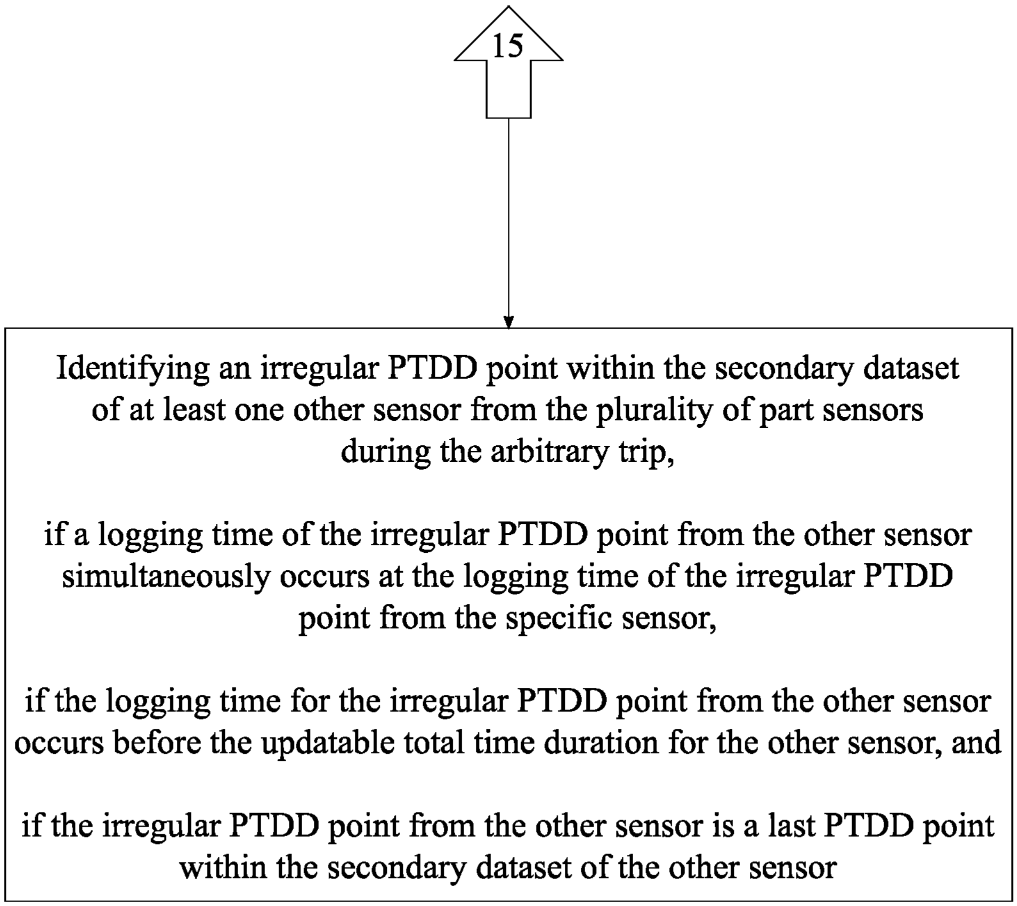
FIG. 17 is a flow chart that illustrates the identification of the potential vehicular problem when the actual total time period for the specific sensor is shorter than the updatable total time duration during the arbitrary trip, and the actual total time period for the other sensor last shorter than the updatable total time duration of the other sensor.

In reference to FIG. 15, FIG. 17, and FIG. 21, when the present invention identifies at least one other sensor from the plurality of sensors is performing out of norm, the present invention then determines that the out of norm performance of the other sensor is related to the actual total time period for the secondary dataset of the specific sensor to perform shorter than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor, if the logging time for the irregular PTDD point from the other sensor occurs before the updatable total time duration for the other sensor, and if the irregular PTDD point from the other sensor is a last PTDD point within the secondary dataset of the other sensor.

As a result, the present invention determines that the actual total time period of the specific sensor performs shorter than the updatable total time duration of the specific sensor due to the fact that the actual total time period of the other sensor is shorter than the updatable total time duration of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being shorter than the updatable total time duration of the specific sensor and the actual total time period of the other sensor being shorter than the updatable total time duration of the other sensor, the present invention wirelessly sends the assessment of the potential vehicular problem from the OBC device to the personal computing device.

Figure 18:
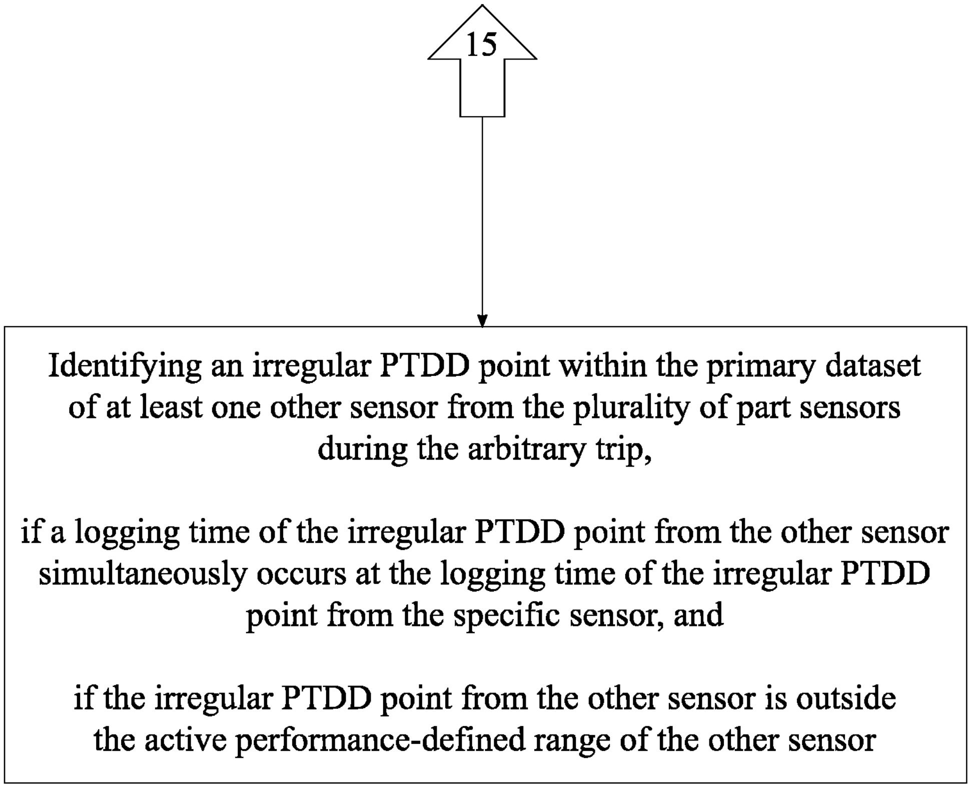
FIG. 18 is a flow chart that illustrates the identification of the potential vehicular problem when the actual total time period for the specific sensor is shorter than the updatable total time duration during the arbitrary trip, and the primary dataset for the other sensor includes irregular PTDD point outside of the active performance-define range.

In reference to FIG. 15, FIG. 18, and FIG. 21, when the present invention identifies at least one other sensor from the plurality of sensors is performing out of norm, the present invention then determines that the out of norm performance of the other sensor is related to the actual total time period for the secondary dataset of the specific sensor to perform shorter than the updatable total time duration of the specific sensor. As a result, the present invention determines that the specific sensor and the other sensor are at fault. More specifically, the present invention identifies the irregular PTDD point within the secondary dataset of the specific sensor during the arbitrary trip. The present invention then identifies an irregular PTDD point within the primary dataset of the other sensor during the arbitrary trip if the logging time of the irregular PTDD point from the other sensor simultaneously occurs at the logging time of the irregular PTDD point from the specific sensor and if the logging time for the irregular PTDD point from the other sensor is outside the active performance-defined range of the other sensor.

As a result, the present invention determines that the actual total time period of the specific sensor performs shorter than the updatable total time duration of the specific sensor due to the fact that the irregular PTDD point from the other sensor is identified outside the active performance-defined range of the other sensor. An assessment of the potential vehicular problem is then generated by annotating the irregular PTDD from the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the actual total time period of the specific sensor being shorter than the updatable total time duration of the specific sensor and the irregular PTDD point from the other sensor being outside the active performance-defined range of the other sensor, the present invention wirelessly sends the assessment of the potential vehicular problem from the OBC device to the personal computing device.

Figure 19:
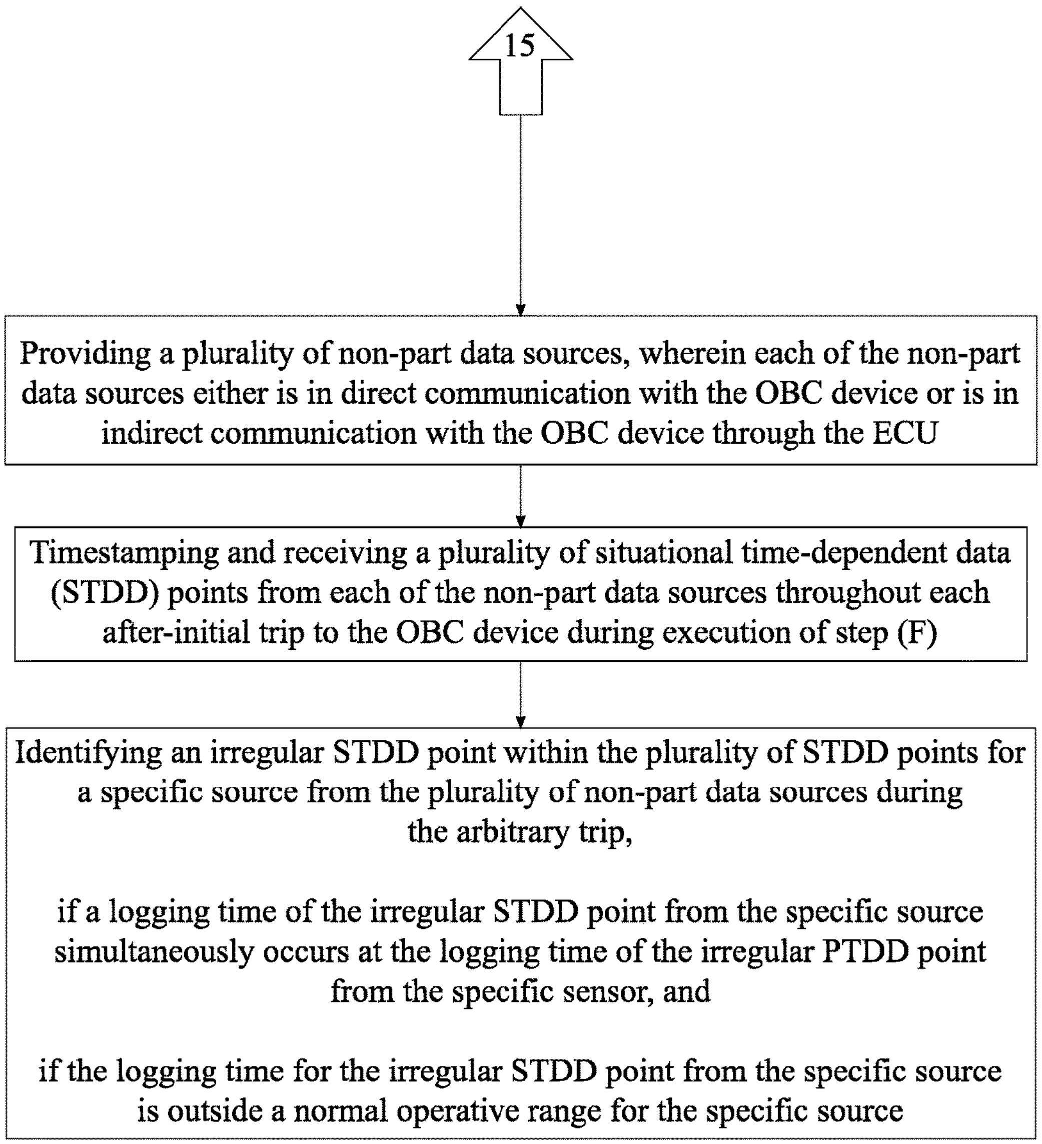
FIG. 19 is a flow chart that illustrates the identification of the potential vehicular problem when the actual total time period for the specific sensor is shorter than the updatable total time duration during the arbitrary trip, and the irregular STDD point for the specific source is outside of the normal operative range.

In reference to FIG. 15, FIG. 19, and FIG. 21, when the present invention identifies identify at least one data source from the plurality of non-part data sources is performing out of norm, the present invention then determines that the out of norm performance of the data source causes the actual total time period for the secondary dataset of the specific sensor to perform shorter than the updatable total time duration of the specific sensor. As a result, the present invention determines that the specific sensor and the data source are at fault. More specifically, the present invention identifies the irregular PTDD point within the secondary dataset of the specific sensor during the arbitrary trip. The present invention then identifies an irregular STDD point within the plurality of STDD points for a specific source from the plurality of non-part data sources during the arbitrary trip if a logging time of the irregular STDD point from the specific source simultaneously occurs at the logging time of the irregular PTDD point from the specific sensor and if the logging time for the irregular STDD point from the specific source is outside a normal operative range for the specific source. The normal operative range for the specific source can be pre-defined within the OBC device in order to provide a standardized outcome from the present invention.

As a result, the present invention determines that the actual total time period of the specific sensor performs shorter than the updatable total time duration of the specific sensor due to the fact that the irregular STDD point from the specific source is identified outside the normal operative range for the specific source. An assessment of the potential vehicular problem is then generated by annotating the irregular PTDD from the specific sensor. The present invention then annotates and adds the irregular STDD point from the specific source into the assessment of the potential vehicular problem, wherein the assessment corresponds to respective vehicular parts of the specific sensor and the specific source. Once the assessment of the potential vehicular problem is generated for the actual total time period of the specific sensor being shorter than the updatable total time duration of the specific sensor and the irregular STDD point from the specific source being outside the normal operative range for the specific source, the present invention wirelessly sends the assessment of the potential vehicular problem from the OBC device to the personal computing device.

Figure 20:
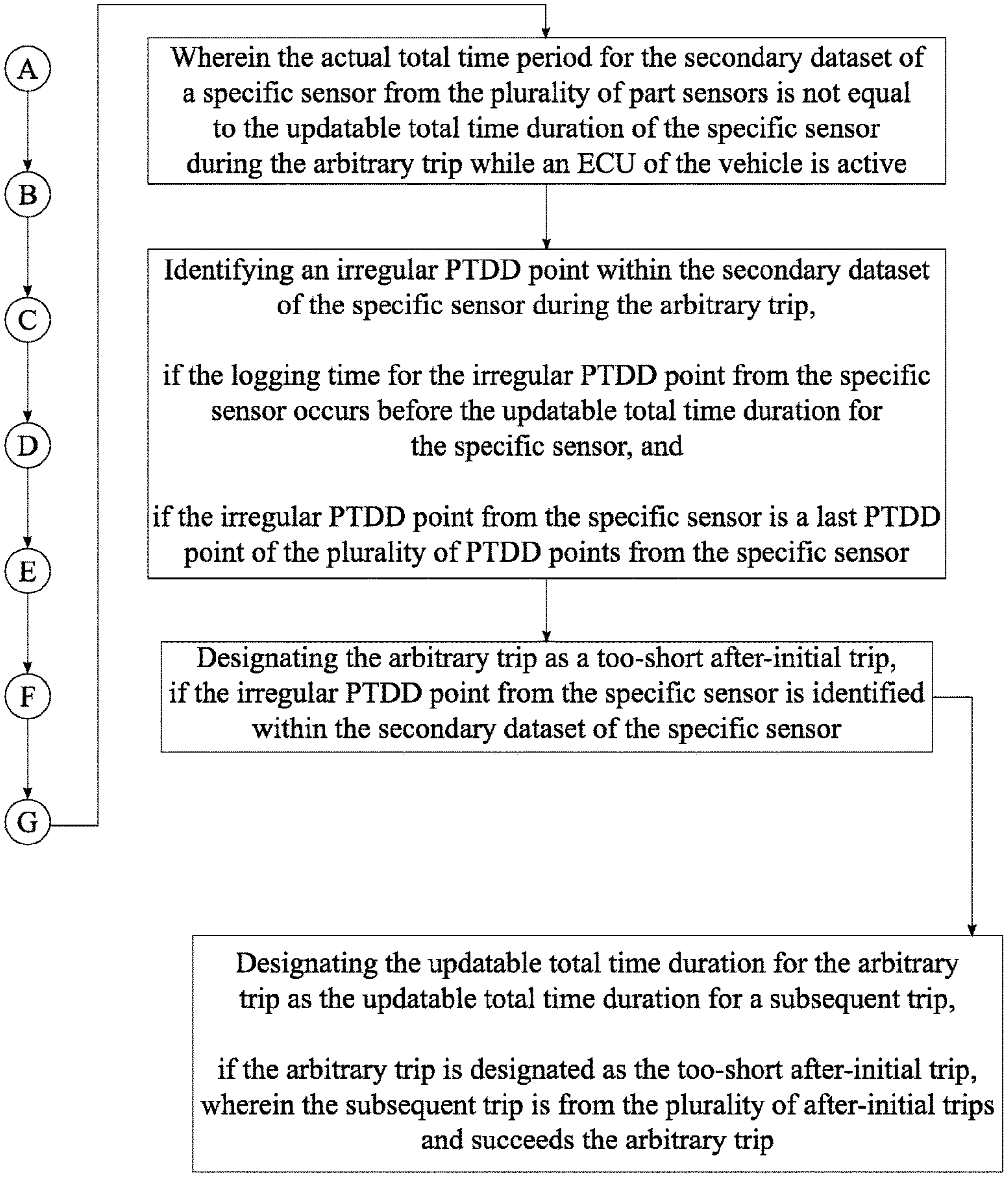
FIG. 20 is a flow chart that illustrates the identification of the potential vehicular problem when the actual total time period for the specific sensor is shorter than the updatable total time duration during the arbitrary trip, and the primary dataset is not collected.

In reference to FIG. 20, when the vehicle is operated for a smaller time period that is not significant enough to the overall process of the present invention, the smaller time period gets stored within the overall process of the present invention as a too-short-after-initial trip. However, the present invention does not implement the plurality of PTDD points from the too-short-after-initial trip into the overall calculations of the present invention. More specifically, the present invention detects the potential vehicular problem from a specific sensor of the plurality of part sensors if the actual total time period for the secondary dataset of a specific sensor from the plurality of part sensors is not equal to the updatable total time duration of the specific sensor during the arbitrary trip while the ECU of the vehicle is active. The present invention is then able to determine that the actual total time period for the secondary dataset of the specific sensor is shorter than the updatable total time duration of the specific sensor, if the logging time for the irregular PTDD point from the specific sensor occurs before the updatable total time duration for the specific sensor and if the irregular PTDD point from the specific sensor is a last PTDD point of the plurality of PTDD points from the specific sensor. In other words, the present invention is able to determine that the secondary dataset of the specific sensor is not completed and the primary dataset is not collected for the arbitrary trip. Then the arbitrary trip is designated as the too-short after-initial trip if the irregular PTDD point from the specific sensor is identified within the secondary dataset of the specific sensor. The plurality of PTDD points with the too-short after-initial trip then becomes irrelevant to the overall process of the present invention. The updatable total time duration for the arbitrary trip is then designated as the updatable total time duration for a subsequent trip if the arbitrary trip is designated as the too-short after-initial trip, wherein the subsequent trip is from the plurality of after-initial trips and succeeds the arbitrary trip.

Figure 22:
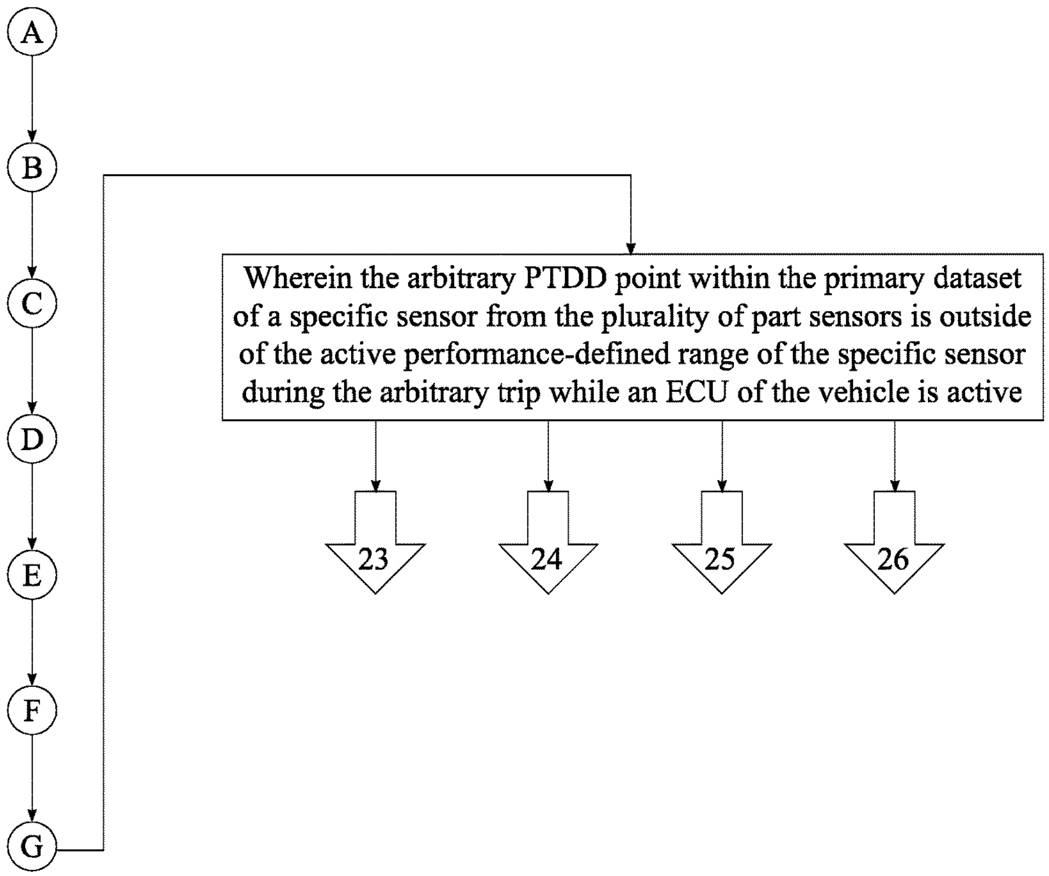
FIG. 22 is a flow chart that illustrates the identification of the potential vehicular problem when the active performance-define range detects any outlier readings during the arbitrary trip.
Figure 27:
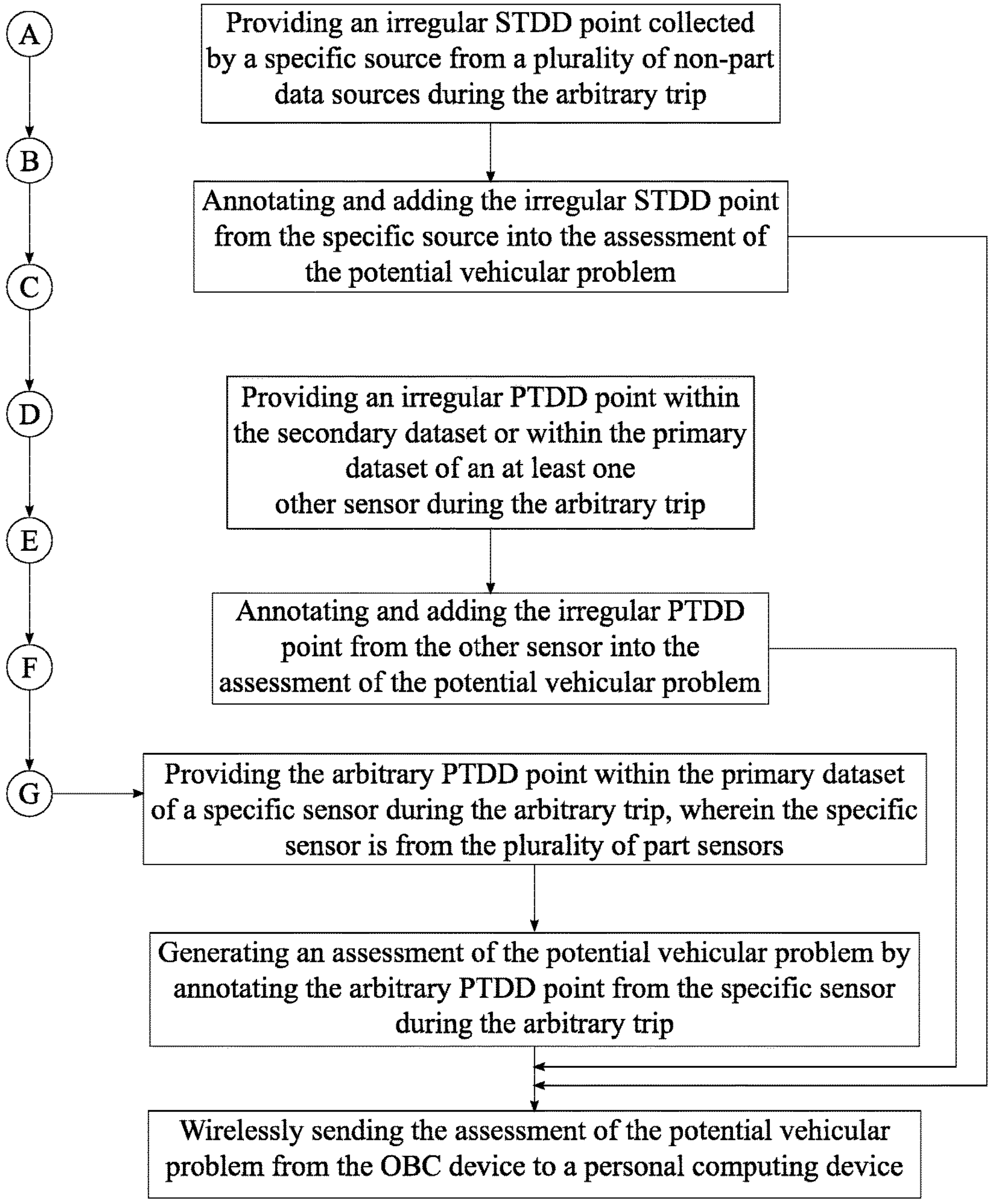
FIG. 27 is a flow chart that illustrates the generation of the assessment for the potential vehicular problem, wherein the arbitrary PTDD is associated with the primary dataset.

In reference to FIG. 4, FIG. 22, and FIG. 27, the present invention detects the potential vehicular problem from a specific sensor of the plurality of part sensors if the arbitrary PTDD point within the primary dataset is outside of the active performance-defined range during the arbitrary trip while the ECU of the vehicle is active. However, this only indicates that the specific sensor has the potential vehicular problem with the primary dataset. In order to further narrow down the potential vehicular problem, the present invention then evaluates the plurality of part sensors excluding the specific sensor. If the present invention is not able to identify at least one other sensor from the plurality of sensors that performs out of norm, the present invention determines that only the specific sensor is at fault. An assessment of the potential vehicular problem is then generated by annotating the arbitrary PTDD point from the specific sensor, wherein the assessment corresponds to the respective vehicular part. Once the assessment of the potential vehicular problem is generated for the arbitrary PTDD point within the primary dataset being outside of the active performance-defined range of the specific sensor, the present invention wirelessly sends the assessment of the potential vehicular problem from the OBC device to the personal computing device.

Figure 23:
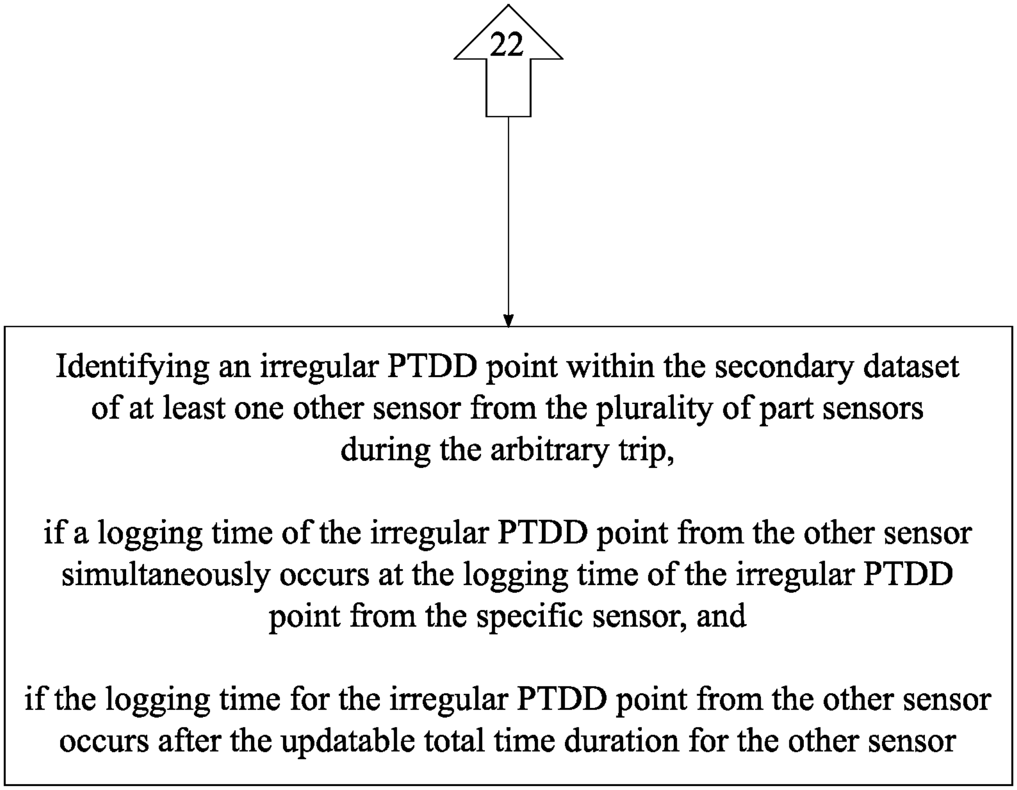
FIG. 23 is a flow chart that illustrates the identification of the potential vehicular problem when the active performance-define range detects any outlier readings during the arbitrary trip, and the actual total time period for the other sensor last longer than the updatable total time duration of the other sensor.

In reference to FIG. 22, FIG. 23, and FIG. 27, when the present invention identifies at least one other sensor from the plurality of sensors is performing out of norm, the present invention then determines that the out of norm performance of the other sensor is related to the arbitrary PTDD point to be detected outside of the active performance-defined range of the specific sensor. As a result, the present invention determines that the specific sensor and the other sensor are at fault. More specifically, the present invention identifies the arbitrary PTDD point within the primary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor, and if the logging time for the irregular PTDD point from the other sensor occurs after the updatable total time duration for the other sensor.

As a result, the present invention determines that the arbitrary PTDD point is detected outside of the active performance-defined range of the specific sensor due to the fact that the actual total time period of the other sensor is longer than the updatable total time duration of the other sensor. An assessment of the potential vehicular problem is then generated by annotating the arbitrary PTDD point within the primary dataset being outside of the active performance-defined range of the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the arbitrary PTDD point within the primary dataset being outside of the active performance-defined range of the specific sensor and the actual total time period of the other sensor being longer than the updatable total time duration of the other sensor, the present invention wirelessly sends the assessment of the potential vehicular problem from the OBC device to the personal computing device.

Figure 24:
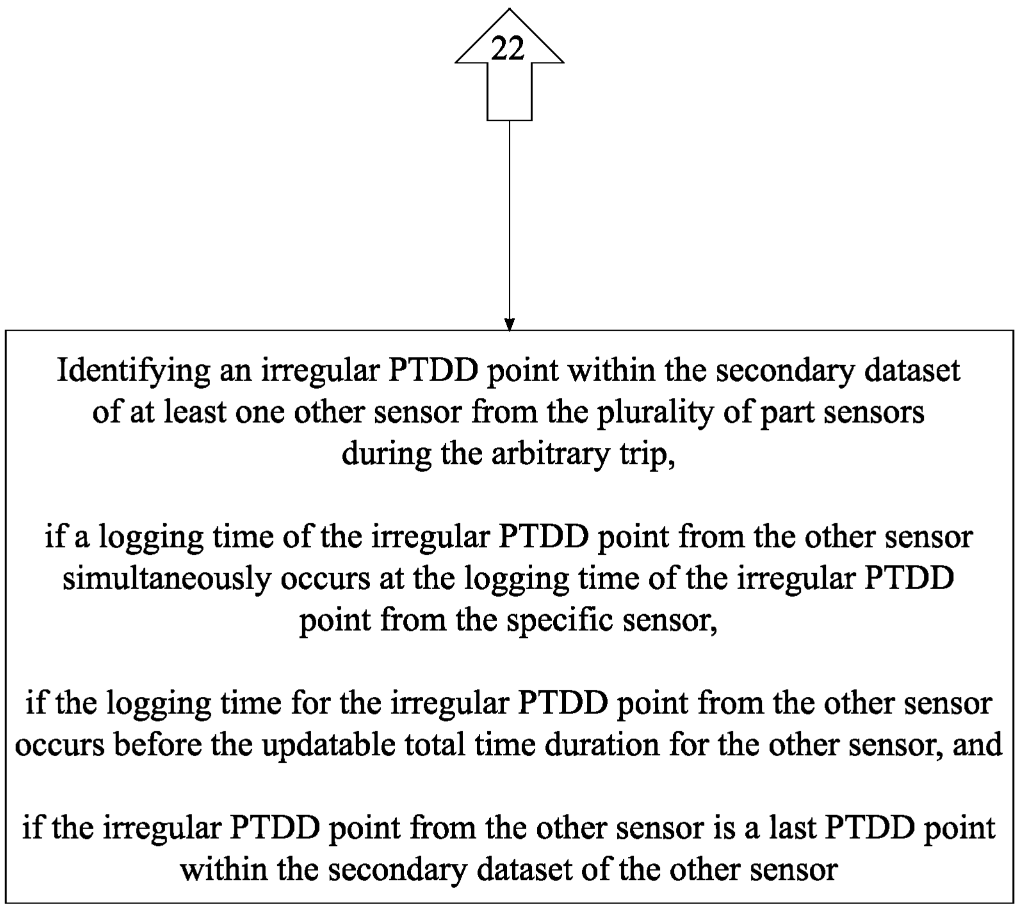
FIG. 24 is a flow chart that illustrates the identification of the potential vehicular problem when the active performance-define range detects any outlier readings during the arbitrary trip, and the actual total time period for the other sensor last shorter than the updatable total time duration of the other sensor.

In reference to FIG. 22, FIG. 24, and FIG. 27, when the present invention identifies at least one other sensor from the plurality of sensors is performing out of norm, the present invention then determines that the out of norm performance of the other sensor is related to the arbitrary PTDD point to be detected outside of the active performance-defined range of the specific sensor. As a result, the present invention determines that the specific sensor and the other sensor are at fault. More specifically, the present invention identifies the arbitrary PTDD point within the primary dataset of the specific sensor during the arbitrary trip. The present invention then identifies an irregular PTDD point within the secondary dataset of the other sensor during the arbitrary trip if the logging time of the irregular PTDD point from the other sensor simultaneously occurs at the logging time of the irregular PTDD point from the specific sensor, if the logging time for the irregular PTDD point from the other sensor occurs before the updatable total time duration for the other sensor, and if the irregular PTDD point from the other sensor is a last PTDD point within the secondary dataset of the other sensor.

As a result, the present invention determines that the arbitrary PTDD point is detected outside of the active performance-defined range of the specific sensor due to the fact that the actual total time period of the other sensor is shorter than the updatable total time duration of the other sensor. An assessment of the potential vehicular problem is then generated by annotating the arbitrary PTDD point within the primary dataset being outside of the active performance-defined range of the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the arbitrary PTDD point within the primary dataset being outside of the active performance-defined range of the specific sensor and the actual total time period of the other sensor being shorter than the updatable total time duration of the other sensor, the present invention wirelessly sends the assessment of the potential vehicular problem from the OBC device to the personal computing device.

Figure 25:
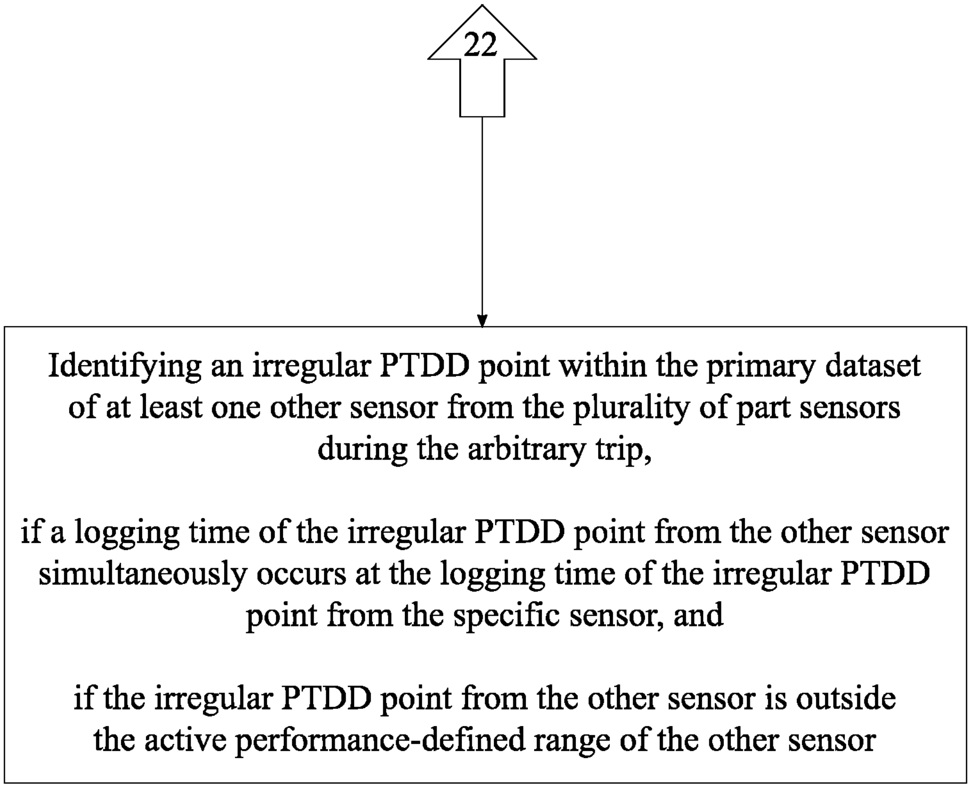
FIG. 25 is a flow chart that illustrates the identification of the potential vehicular problem when the active performance-define range detects any outlier readings during the arbitrary trip, and the primary dataset for the other sensor includes irregular PTDD point outside of the active performance-define range.

In reference to FIG. 22, FIG. 25, and FIG. 27, when the present invention identifies at least one other sensor from the plurality of sensors is performing out of norm, the present invention then determines that the out of norm performance of the other sensor causes the arbitrary PTDD point to be detected outside of the active performance-defined range of the specific sensor. As a result, the present invention determines that the specific sensor and the other sensor are at fault. More specifically, the present invention identifies the arbitrary PTDD point within the primary dataset of the specific sensor during the arbitrary trip. The present invention then identifies an irregular PTDD point within the primary dataset of the other sensor during the arbitrary trip if the logging time of the irregular PTDD point from the other sensor simultaneously occurs at the logging time of the irregular PTDD point from the specific sensor and if the logging time for the irregular PTDD point from the other sensor is outside the active performance-defined range of the other sensor.

As a result, the present invention determines that the arbitrary PTDD point is detected outside of the active performance-defined range of the specific sensor due to the fact that the irregular PTDD point from the other sensor is identified outside the active performance-defined range of the other sensor. An assessment of the potential vehicular problem is then generated by annotating the arbitrary PTDD point within the primary dataset being outside of the active performance-defined range of the specific sensor. The present invention then annotates and adds the irregular PTDD point from the other sensor into the assessment of the potential vehicular problem, wherein the assessment corresponds to respective vehicular parts of the specific sensor and the other sensor. Once the assessment of the potential vehicular problem is generated for the arbitrary PTDD point within the primary dataset being outside of the active performance-defined range of the specific sensor and the irregular PTDD point from the other sensor being outside the active performance-defined range of the other sensor, the present invention wirelessly sends the assessment of the potential vehicular problem from the OBC device to the personal computing device.

Figure 26:
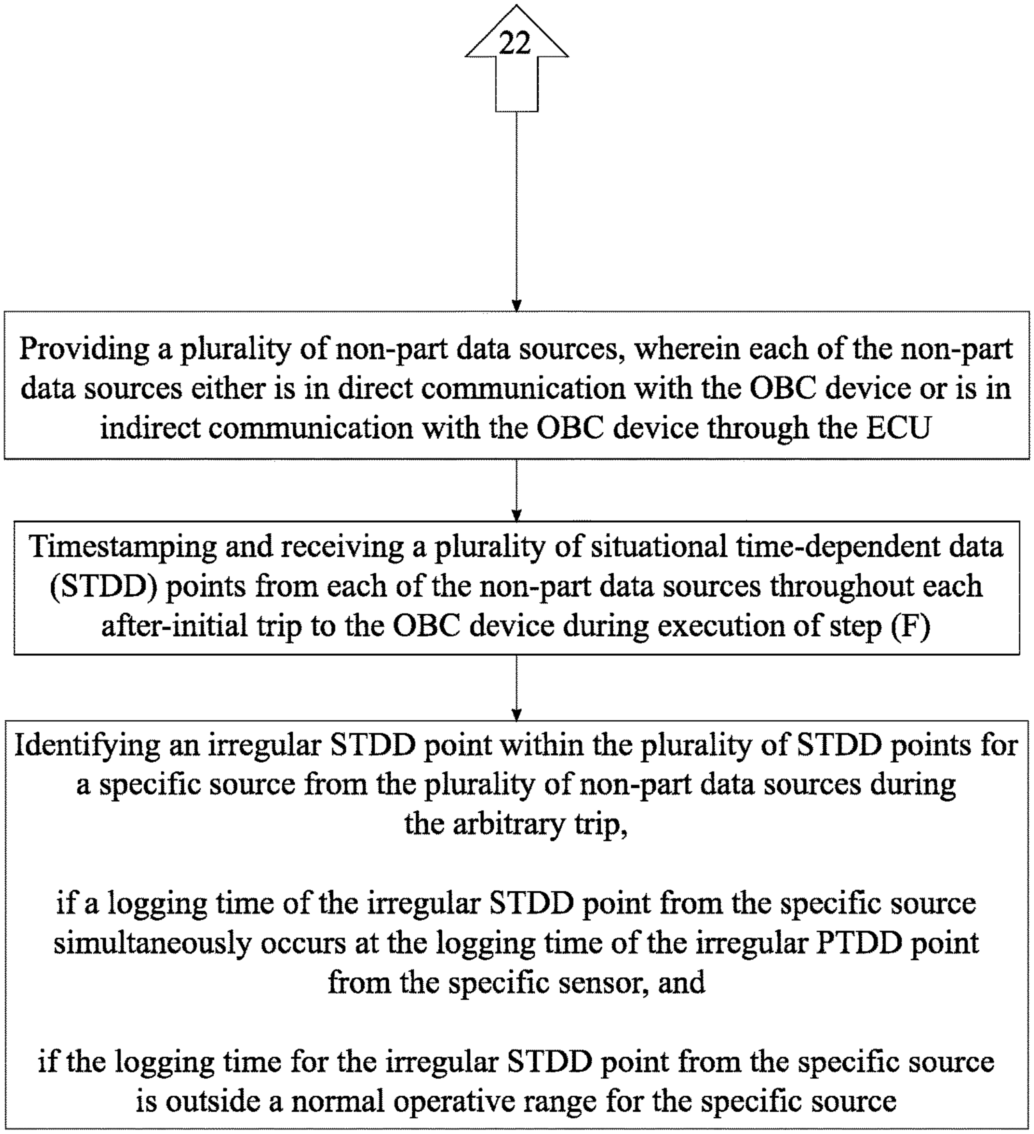
FIG. 26 is a flow chart that illustrates the identification of the potential vehicular problem when the active performance-define range detects any outlier readings during the arbitrary trip, and the irregular STDD point for the specific source is outside of the normal operative range.

In reference to FIG. 22, FIG. 26, and FIG. 27, when the present invention identifies identify at least one data source from the plurality of non-part data sources is performing out of norm, the present invention then determines that the out of norm performance of the data source is related to the arbitrary PTDD point to be detected outside of the active performance-defined range of the specific sensor. As a result, the present invention determines that the specific sensor and the data source are at fault. More specifically, the present invention identifies the arbitrary PTDD point within the primary dataset of the specific sensor during the arbitrary trip. The present invention then identifies an irregular STDD point within the plurality of STDD points for a specific source from the plurality of non-part data sources during the arbitrary trip if a logging time of the irregular STDD point from the specific source simultaneously occurs at the logging time of the irregular PTDD point from the specific sensor and if the logging time for the irregular STDD point from the specific source is outside a normal operative range for the specific source. The normal operative range for the specific source can be pre-defined within the OBC device in order to provide a standardized outcome from the present invention.

As a result, the present invention determines that the arbitrary PTDD point is detected outside of the active performance-defined range of the specific sensor due to the fact that the irregular STDD point from the specific source is identified outside the normal operative range for the specific source. An assessment of the potential vehicular problem is then generated by annotating the irregular PTDD from the specific sensor. The present invention then annotates and adds the irregular STDD point from the specific source into the assessment of the potential vehicular problem, wherein the assessment corresponds to respective vehicular parts of the specific sensor and the specific source. Once the assessment of the potential vehicular problem is generated the arbitrary PTDD point within the primary dataset being outside of the active performance-defined range of the specific sensor and the irregular STDD point from the specific source being outside the normal operative range for the specific source, the present invention wirelessly sends the assessment of the potential vehicular problem from the OBC device to the personal computing device.

Figure 28:
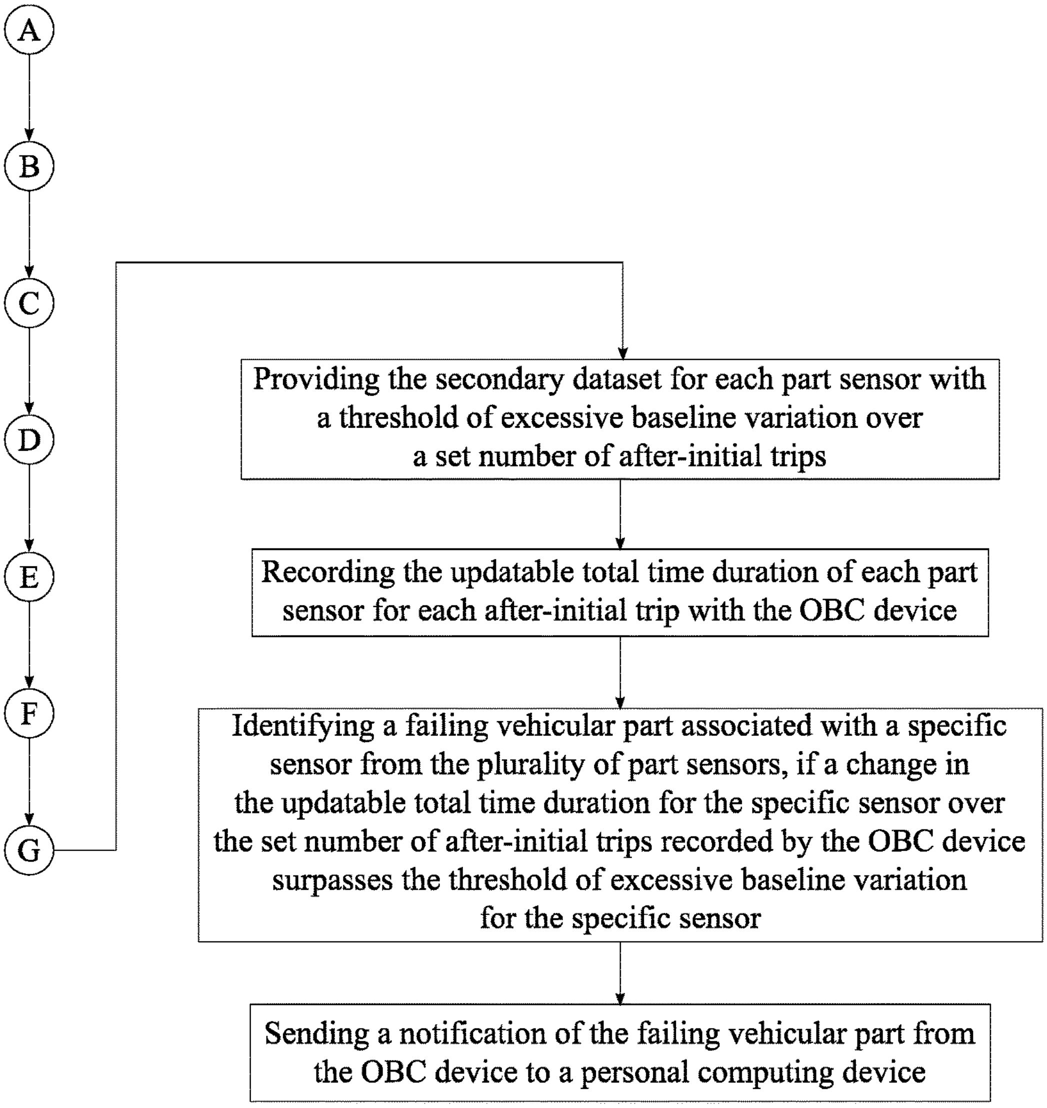
FIG. 28 is a flow chart that illustrates the process of detecting part failure with the secondary dataset.
Figure 29:
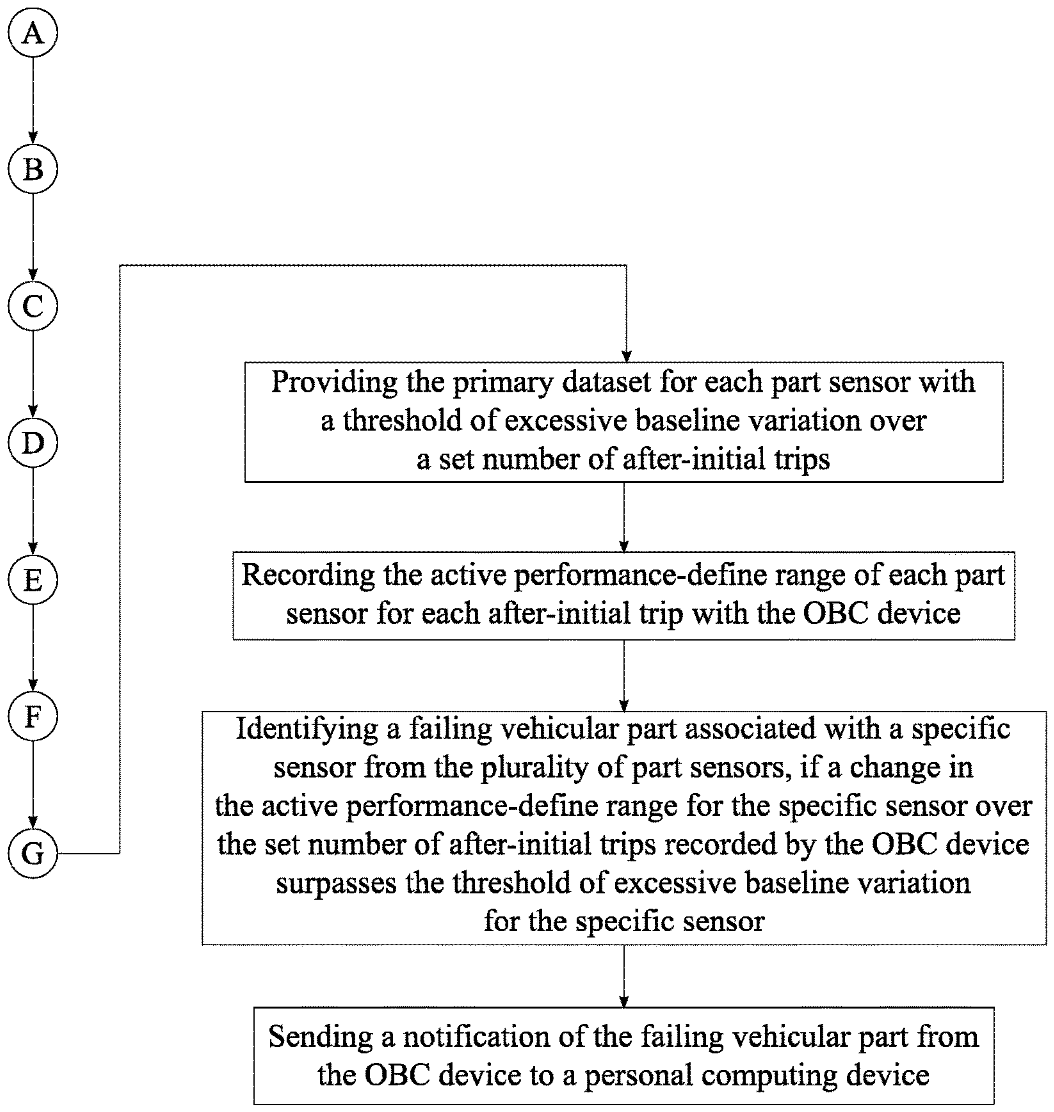
FIG. 29 is a flow chart that illustrates the process of detecting part failure with the primary dataset.

In reference to FIG. 28-29, the present invention predicts a vehicular part failure during the operation of the vehicle. As a result, the present invention is able to determine that the respective vehicular part needs to repair or replace before the vehicle completely brakes down due to the complete failure of the respective vehicular part. The predictive part failure is generally detected within the secondary dataset or the primary dataset as a vehicular part can fail within each dataset, where one does not precede the other.

In reference to FIG. 28, the present invention includes a threshold of excessive baseline variation for the secondary dataset of each part sensor over a set number of after-initial trips. As a result, the threshold of excessive baseline variation for the secondary dataset functions as a reference baseline for the respective part sensor. Since the updatable total time duration of each part sensor is calculated for each after-initial trip with the OBC device, the present invention is then able to predict whether a vehicular part is failing or not through the comparison of the updatable total time duration and the threshold of excessive baseline variation for the secondary dataset. If a change in the updatable total time duration for a specific sensor over the set number of after-initial trips recorded by the OBC device surpasses the threshold of excessive baseline variation for the secondary dataset of the specific sensor, the present invention predicts that a failing vehicular part associated with the specific sensor. Then, a notification of the failing vehicular part is sent to the personal computing device from the OBC device.

In reference to FIG. 29, the present invention includes a threshold of excessive baseline variation for the primary dataset of each part sensor over a set number of after-initial trips. As a result, the threshold of excessive baseline variation for the primary dataset functions as a reference baseline for the respective part sensor. Since the active performance-defined range of each part sensor is calculated for each after-initial trip with the OBC device, the present invention is then able to predict whether a vehicular part is failing or not through the comparison of the active performance-defined range and the threshold of excessive baseline variation for the primary dataset. If a change in the active performance-defined range for a specific sensor over the set number of after-initial trips recorded by the OBC device surpasses the threshold of excessive baseline variation for the primary dataset of the specific sensor, the present invention predicts that a failing vehicular part associated with the specific sensor. Then, a notification of the failing vehicular part is sent to the personal computing device from the OBC device.

The notification of the failing vehicular part can be utilized to identify either a vehicular part that is not performing at its full capacity due to lifespan or a defective vehicular part. Additionally, the notification of the failing vehicular part also able to isolate how the vehicular part is failing with respect the threshold of excessive baseline variation for the secondary dataset or the threshold of excessive baseline variation for the primary dataset.

Figure 30:
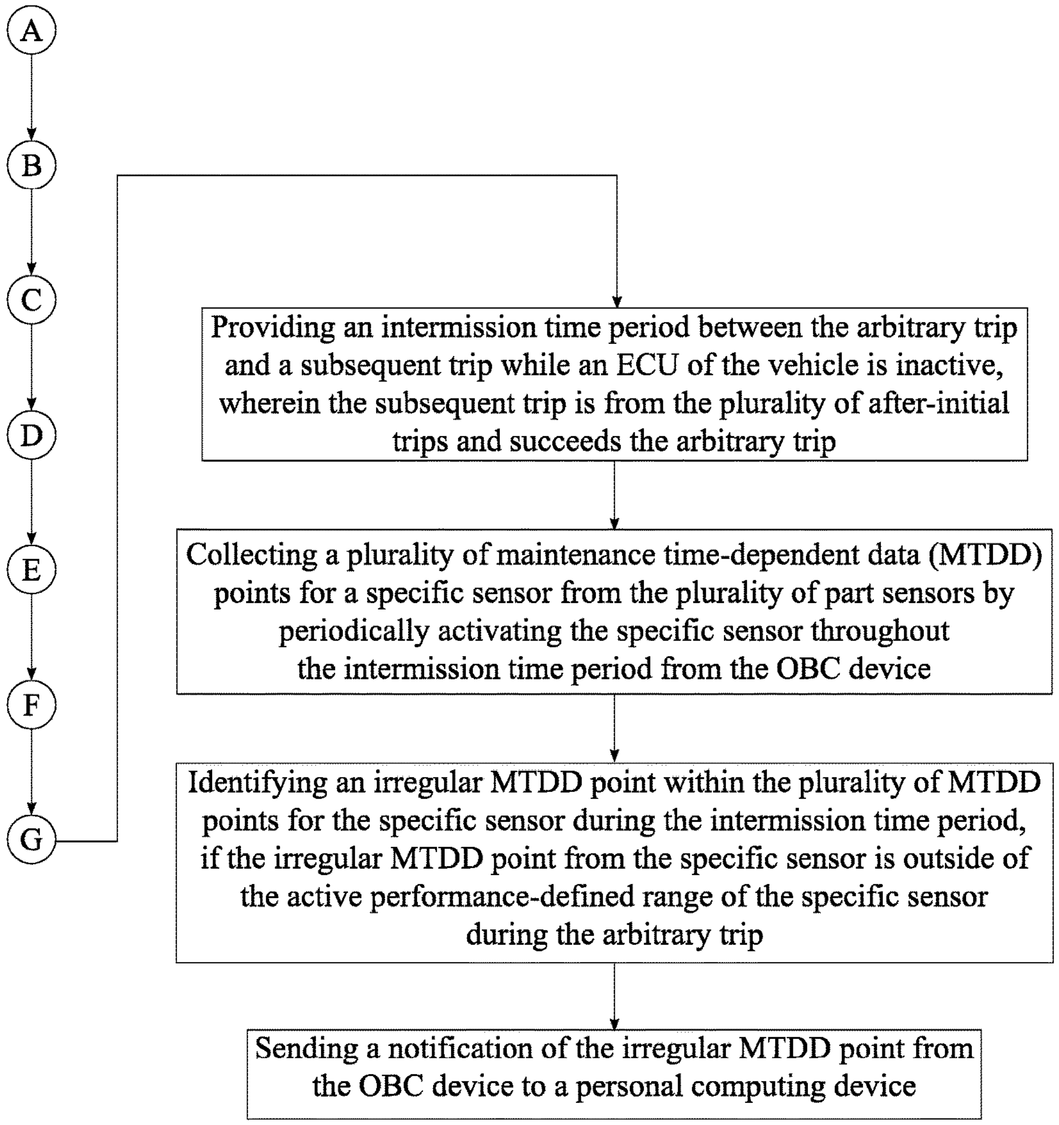
FIG. 30 is a flow chart that illustrates the process of detecting part failure when the vehicle is in between two consecutive trip.

In reference to FIG. 30, the present invention also collects a plurality of maintenance time-dependent data (MTDD) points for a specific sensor from the plurality of part sensors to assess the current condition of the vehicle. More specifically, the plurality of MTDD points is periodically collected for the specific sensor throughout an intermission time period by the OBC device. The time period between the arbitrary trip and a subsequent trip while an ECU of the vehicle is inactive defined as the intermission time period, wherein the subsequent trip is from the plurality of after-initial trips and succeeds the arbitrary trip. Then the present invention is able to identify an irregular MTDD point within the plurality of MTDD points for the specific sensor during the intermission time period if the irregular MTDD point from the specific sensor is outside of the active performance-defined range of the specific sensor during the arbitrary trip.

Then, a notification of the irregular MTDD point is sent from the OBC device to the personal computing device in order to update the condition the respective vehicular part associated with the irregular MTDD point. For example, the OBC device periodically collects electrical current of the battery so that the OBC device is able to determine the drain rate of the battery thus concluding the condition of the battery in between two consecutive vehicular trips.

The present invention can be implemented to different vehicular companies in order to ease the day to day operation of those vehicular companies. When the assessment of the potential vehicular problem, the notification of the failing vehicular part, or the notification of the irregular MTDD point is generated thought the present invention, an owner of a faulty vehicle is able to take care of a defective vehicular part by scheduling maintenance appointment or a repair appointment with a service center. In the same event, a rental vehicle with the defective vehicular part is able to take care of the defective vehicular part by providing a replacement vehicle for the renters by providing routing information to the closest service center or rendezvous with another car to swap passengers. In the same event, an autonomous vehicle with defective vehicular part can be re-routed to the closest service center so that necessary repair can be completed without further compromising the autonomous vehicle. In the same event, transportation vehicles with defective vehicular part can be repaired by scheduling maintenance appointment or a repair appointment with a service department.

Once the assessment of the potential vehicular problem is sent to the personal computing device, the assessment of the potential vehicular problem is displayed with a vehicular part performance pattern that allows manual validation for the owner/driver. The manual validations allow the owner/driver to understand how the vehicle is operated and acknowledge whether they are aware of the reason for the irregular PTDD point within the secondary dataset and/or the arbitrary PTDD point within the primary dataset and if the vehicle is being used in a manner different from daily usage. If the vehicular part performance pattern is generated within the present invention, the vehicular part performance pattern is recorded and cataloged for future reference. If in the future, the same irregular PTDD point or the arbitrary PTDD point combination is recognized within the specific sensor and the other sensor, the present invention does not generate an assessment of the potential vehicular problem and the system returns to normal status. For example, when the engine load is high and RPMs are higher than normal, the present invention generates the assessment of the potential vehicular problem and alert the personal computing device. However, when the owner/driver manual validations the assessment of the potential vehicular problem, the present invention confirms that the assessment of the potential vehicular problem is generated due to the fact vehicle is towing, justifying the higher than normal engine load.

Since the present invention is able to compare vehicular part performance pattern not only during normal operation, but also during all kinds of driving patterns and conditions for the life of the vehicle, which in return provides a better understanding/awareness to the vehicular part's true performance under all conditions, and also establishes a self-learning system that can differentiate a potential vehicular problem and a pre-existing driving pattern.

Additionally, the present invention is able to detect minor decreases or increases to the part sensors such as oil pressure, fuel pressure, engine temperature, engine load, etc. These minor decreases or increases then relates to performance trends such as towing, racing, traveling uphill, or normal daily operation to make an accurate determination as to whether the vehicular part is beginning to decline in performance.

Additionally, the present invention also detects when a replacement part is defective. When the replacement part is installed, the present invention detects immediately whether the active performance-defined range for the replacement part is better or worse than the previous part. Even if the replacement part to be functional, but not performing at the expected performance level, the present invention would detect and communicate that to the personal computing device as the assessment of the potential vehicular problem.

Although the invention has been explained in relation to its preferred embodiment, it is to be understood that many other possible modifications and variations can be made without departing from the spirit and scope of the invention as hereinafter claimed.

What is claimed is:

1. A method of determining a predictive failure for vehicular component comprises the steps of:

(A) providing a vehicle with a plurality of part sensors and an on-board computing (OBC) device, wherein each part sensor is communicably coupled with the OBC device;

(B) providing a primary dataset and a secondary dataset for each part sensor, wherein the primary dataset is associated with an active performance-defined range, and wherein the secondary dataset is associated with an updatable total time duration;

(C) timestamping and receiving a performance time-dependent data (PTDD) point from each part sensor to the OBC device;

(D) sorting the PTDD point into the secondary dataset with the OBC device, if the PTDD point is outside the active performance-defined range, and if the primary dataset is empty;

(E) sorting the PTDD point into the primary dataset with the OBC device, if the PTDD point is within the active performance-defined range, or if the primary dataset is not empty;

(F) repeating steps (B) through (E) throughout each after-initial trip completed by the vehicle in order to populate the primary dataset and the secondary dataset for each part sensor with a plurality of PTDD points;

storing each of the plurality of PTDD points for each part sensor on the OBC device at a recording time interval during step (F), timestamping each of the plurality of PTDD points with a logging time during step (F); and (G) identifying a potential vehicular problem during an arbitrary trip with the OBC device, if an actual total time period for the secondary dataset is not equal to the updatable total time duration during the arbitrary trip, or if an arbitrary PTDD point within the primary dataset is outside of the active performance-defined range during the arbitrary trip, wherein the arbitrary trip is any one of the plurality of after-initial trips.

2. The method of determining a predictive failure for vehicular component as claimed in claim 1 comprises the steps of:

timestamping and receiving a plurality of initial PTDD points for an initial trip completed by the vehicle from each part sensor to the OBC device;

designating a series of incremental performance ranges from a first PTDD point amongst the plurality of initial PTDD points;

generating a plurality of initial datasets by sorting each initial PTDD point into the incremental performance ranges, wherein each initial dataset is associated to a corresponding range from the series of incremental performance ranges;

calculating a completion time period for each initial dataset;

designating a specific dataset from the plurality of initial datasets as an initial primary dataset, if the completion time period of the specific dataset is longer than the completion time period of each remaining dataset from the plurality of initial datasets; and collectively designating the remaining datasets as an initial secondary dataset.

3. The method of determining a predictive failure for vehicular component as claimed in claim 1 comprises the steps of:

providing an initial primary dataset for each part sensor of the vehicle;

designating a maximum value from the initial primary dataset as an upper limit of the active performance-defined range for a first trip with the OBC device, wherein the first trip is from the plurality of after-initial trips; and designating a minimum value from the initial primary dataset as a lower limit of the active performance-defined range for the first trip with the OBC device.

4. The method of determining a predictive failure for vehicular component as claimed in claim 1 comprises the steps of:

providing an upper limit and a lower limit for the active performance-defined range for a prior trip, wherein the prior trip is from the plurality of after-initial trips and precedes the arbitrary trip;

averaging the upper limit of the active performance-defined range for the prior trip and a maximum value from the primary dataset for the prior trip in order to compute an upper limit of the active performance-defined range for the arbitrary trip; and averaging the lower limit of the active performance-defined range for the prior trip and a minimum value from the primary dataset for the prior trip in order to compute a lower limit of the active performance-defined range for the arbitrary trip.

5. The method of determining a predictive failure for vehicular component as claimed in claim 1 comprises the steps of:

providing an initial secondary dataset from each part sensor of the vehicle;

calculating an initial actual total time period for the initial secondary dataset; and designating the initial actual total time period as the updatable total time duration for a first trip with the OBC device, wherein the first trip is from the plurality of after-initial trips.

6. The method of determining a predictive failure for vehicular component as claimed in claim 1 comprises the steps of:

providing the updatable total time duration for a prior trip, wherein the prior trip is from the plurality of after-initial trips and precedes the arbitrary trip;

calculating the actual total time period for the secondary dataset of the prior trip; and averaging the actual total time period for the secondary dataset of the prior trip and the updatable total time duration for the prior trip in order to compute the updatable total time duration for the arbitrary trip.

7. The method of determining a predictive failure for vehicular component as claimed in claim 1 comprises the step of:

wherein the actual total time period for the secondary dataset of a specific sensor from the plurality of part sensors is not equal to the updatable total time duration of the specific sensor during the arbitrary trip while an engine control unit (ECU) of the vehicle is active; and identifying an irregular PTDD point within the secondary dataset of the specific sensor during the arbitrary trip, if a logging time for the irregular PTDD point from the specific sensor occurs after the updatable total time duration for the specific sensor.

8. The method of determining a predictive failure for vehicular component as claimed in claim 7 comprises the step of:

identifying an irregular PTDD point within the secondary dataset of at least one other sensor from the plurality of part sensors during the arbitrary trip, if a logging time of the irregular PTDD point from the other sensor simultaneously occurs at the logging time of the irregular PTDD point from the specific sensor, and if the logging time for the irregular PTDD point from the other sensor occurs after the updatable total time duration for the other sensor.

9. The method of determining a predictive failure for vehicular component as claimed in claim 7 comprises the step of:

identifying an irregular PTDD point within the secondary dataset of at least one other sensor from the plurality of part sensors during the arbitrary trip, if a logging time of the irregular PTDD point from the other sensor simultaneously occurs at the logging time of the irregular PTDD point from the specific sensor, and if the logging time for the irregular PTDD point from the other sensor occurs before the updatable total time duration for the other sensor, and if the irregular PTDD point from the other sensor is a last PTDD point within the secondary dataset of the other sensor.

10. The method of determining a predictive failure for vehicular component as claimed in claim 7 comprises the step of:

identifying an irregular PTDD point within the primary dataset of at least one other sensor from the plurality of part sensors during the arbitrary trip, if a logging time of the irregular PTDD point from the other sensor simultaneously occurs at the logging time of the irregular PTDD point from the specific sensor, and if the irregular PTDD point from the other sensor is outside the active performance-defined range of the other sensor.

11. The method of determining a predictive failure for vehicular component as claimed in claim 7 comprises the steps of:

providing a plurality of non-part data sources, wherein each of the non-part data sources either is in direct communication with the OBC device or is in indirect communication with the OBC device through the ECU;

timestamping and receiving a plurality of situational time-dependent data (STDD) points from each of the non-part data sources throughout each after-initial trip to the OBC device during execution of step (F); and identifying an irregular STDD point within the plurality of STDD points for a specific source from the plurality of non-part data sources during the arbitrary trip, if a logging time of the irregular STDD point from the specific source simultaneously occurs at the logging time of the irregular PTDD point from the specific sensor, and if the logging time for the irregular STDD point from the specific source is outside a normal operative range for the specific source.

12. The method of determining a predictive failure for vehicular component as claimed in claim 1 comprises the step of:

wherein the actual total time period for the secondary dataset of a specific sensor from the plurality of part sensors is not equal to the updatable total time duration of the specific sensor during the arbitrary trip while an ECU of the vehicle is active; and identifying an irregular PTDD point within the secondary dataset of the specific sensor during the arbitrary trip, if the logging time for the irregular PTDD point from the specific sensor occurs before the updatable total time duration for the specific sensor, and if the irregular PTDD point from the specific sensor is a last PTDD point within the secondary dataset of the specific sensor.

13. The method of determining a predictive failure for vehicular component as claimed in claim 12 comprises the step of:

identifying an irregular PTDD point within the secondary dataset of at least one other sensor from the plurality of part sensors during the arbitrary trip, if a logging time of the irregular PTDD point from the other sensor simultaneously occurs at the logging time of the irregular PTDD point from the specific sensor, and if the logging time for the irregular PTDD point from the other sensor occurs after the updatable total time duration for the other sensor.

14. The method of determining a predictive failure for vehicular component as claimed in claim 12 comprises the step of:

identifying an irregular PTDD point within the secondary dataset of at least one other sensor from the plurality of part sensors during the arbitrary trip, if a logging time of the irregular PTDD point from the other sensor simultaneously occurs at the logging time of the irregular PTDD point from the specific sensor, and if the logging time for the irregular PTDD point from the other sensor occurs before the updatable total time duration for the other sensor, and if the irregular PTDD point from the other sensor is a last PTDD point within the secondary dataset of the other sensor.

15. The method of determining a predictive failure for vehicular component as claimed in claim 12 comprises the step of:

identifying an irregular PTDD point within the primary dataset of at least one other sensor from the plurality of part sensors during the arbitrary trip, if a logging time of the irregular PTDD point from the other sensor simultaneously occurs at the logging time of the irregular PTDD point from the specific sensor, and if the irregular PTDD point from the other sensor is outside the active performance-defined range of the other sensor.

16. The method of determining a predictive failure for vehicular component as claimed in claim 12 comprises the steps of:

providing a plurality of non-part data sources, wherein each of the non-part data sources either is in direct communication with the OBC device or is in indirect communication with the OBC device through the ECU;

timestamping and receiving a plurality of situational time-dependent data (STDD) points from each of the non-part data sources throughout each after-initial trip to the OBC device during execution of step (F); and identifying an irregular STDD point within the plurality of STDD points for a specific source from the plurality of non-part data sources during the arbitrary trip, if a logging time of the irregular STDD point from the specific source simultaneously occurs at the logging time of the irregular PTDD point from the specific sensor, and if the logging time for the irregular STDD point from the specific source is outside a normal operative range for the specific source.

17. The method of determining a predictive failure for vehicular component as claimed in claim 1 comprises the steps of:

wherein the actual total time period for the secondary dataset of a specific sensor from the plurality of part sensors is not equal to the updatable total time duration of the specific sensor during the arbitrary trip while an ECU of the vehicle is active;

identifying an irregular PTDD point within the secondary dataset of the specific sensor during the arbitrary trip, if the logging time for the irregular PTDD point from the specific sensor occurs before the updatable total time duration for the specific sensor, and if the irregular PTDD point from the specific sensor is a last PTDD point of the plurality of PTDD points from the specific sensor; and designating the arbitrary trip as a too-short after-initial trip, if the irregular PTDD point from the specific sensor is identified within the secondary dataset of the specific sensor.

18. The method of determining a predictive failure for vehicular component as claimed in claim 17 comprises the step of:

designating the updatable total time duration for the arbitrary trip as the updatable total time duration for a subsequent trip, if the arbitrary trip is designated as the too-short after-initial trip, wherein the subsequent trip is from the plurality of after-initial trips and succeeds the arbitrary trip.

19. The method of determining a predictive failure for vehicular component as claimed in claim 1 comprises the steps of:

providing an irregular PTDD point within the secondary dataset of a specific sensor during the arbitrary trip, wherein the specific sensor is from the plurality of part sensors;

generating an assessment of the potential vehicular problem by annotating the irregular PTDD point from the specific sensor during the arbitrary trip; and wirelessly sending the assessment of the potential vehicular problem from the OBC device to a personal computing device.

20. The method of determining a predictive failure for vehicular component as claimed in claim 19 comprises the steps of:

providing an irregular PTDD point within the secondary dataset or within the primary dataset of an at least one other sensor during the arbitrary trip, wherein the other sensor is from the plurality of part sensors; and annotating and adding the irregular PTDD point from the other sensor into the assessment of the potential vehicular problem.

21. The method of determining a predictive failure for vehicular component as claimed in claim 19 comprises the steps of:

providing an irregular STDD point collected by a specific source from a plurality of non-part data sources during the arbitrary trip; and annotating and adding the irregular STDD point from the specific source into the assessment of the potential vehicular problem.

22. The method of determining a predictive failure for vehicular component as claimed in claim 1, wherein the arbitrary PTDD point within the primary dataset of a specific sensor from the plurality of part sensors is outside of the active performance-defined range of the specific sensor during the arbitrary trip while an ECU of the vehicle is active.

23. The method of determining a predictive failure for vehicular component as claimed in claim 22 comprises the step of:

identifying an irregular PTDD point within the secondary dataset of at least one other sensor from the plurality of part sensors during the arbitrary trip, if a logging time of the irregular PTDD point from the other sensor simultaneously occurs at a logging time of the arbitrary PTDD point from the specific sensor, and if the logging time for the irregular PTDD point from the other sensor occurs after the updatable total time duration for the other sensor.

24. The method of determining a predictive failure for vehicular component as claimed in claim 22 comprises the step of:

identifying an irregular PTDD point within the secondary dataset of at least one other sensor from the plurality of part sensors during the arbitrary trip, if a logging time of the irregular PTDD point from the other sensor simultaneously occurs at a logging time of the arbitrary PTDD point from the specific sensor, and if the logging time for the irregular PTDD point from the other sensor occurs before the updatable total time duration for the other sensor, and if the irregular PTDD point from the other sensor is a last PTDD point within the secondary dataset of the other sensor.

25. The method of determining a predictive failure for vehicular component as claimed in claim 22 comprises the step of:

identifying an irregular PTDD point within the primary dataset of at least one other sensor from the plurality of part sensors during the arbitrary trip, if a logging time of the irregular PTDD point from the other sensor simultaneously occurs at the logging time of the irregular PTDD point from the specific sensor, and if the irregular PTDD point from the other sensor is outside the active performance-defined range of the other sensor.

26. The method of determining a predictive failure for vehicular component as claimed in claim 22 comprises the steps of:

providing a plurality of non-part data sources, wherein each of the non-part data sources either is in direct communication with the OBC device or is in indirect communication with the OBC device through the ECU;

timestamping and receiving a plurality of situational time-dependent data (STDD) points from each of the non-part data sources throughout each after-initial trip to the OBC device during execution of step (F); and identifying an irregular STDD point within the plurality of STDD points for a specific source from the plurality of non-part data sources during the arbitrary trip, if a logging time of the irregular STDD point from the specific source simultaneously occurs at the logging time of the irregular PTDD point from the specific sensor, and if the logging time for the irregular STDD point from the specific source is outside a normal operative range for the specific source.

27. The method of determining a predictive failure for vehicular component as claimed in claim 1 comprises the steps of:

providing the arbitrary PTDD within the primary dataset of a specific sensor during the arbitrary trip, wherein the specific sensor is from the plurality of part sensors;

generating an assessment of the potential vehicular problem by annotating the arbitrary PTDD point from the specific sensor; and wirelessly sending the assessment of the potential vehicular problem from the OBC device to a personal computing device.

28. The method of determining a predictive failure for vehicular component as claimed in claim 27 comprises the steps of:

providing an irregular PTDD point within the secondary dataset or within the primary dataset of an at least one other sensor during the arbitrary trip, wherein the other sensor is from the plurality of part sensors; and annotating and adding the irregular PTDD point from the other sensor into the assessment of the potential vehicular problem.

29. The method of determining a predictive failure for vehicular component as claimed in claim 27 comprises the steps of:

providing an irregular STDD point collected by a specific source from a plurality of non-part data sources during the arbitrary trip; and annotating and adding the irregular STDD point from the other sensor into the assessment of the potential vehicular problem.

30. The method of determining a predictive failure for vehicular component as claimed in claim 1 comprises the steps of:

providing the secondary dataset for each part sensor with a threshold of excessive baseline variation over a set number of after-initial trips;

recording the updatable total time duration of each part sensor for each after-initial trip with the OBC device;

identifying a failing vehicular part associated with a specific sensor from the plurality of part sensors, if a change in the updatable total time duration for the specific sensor over the set number of after-initial trips recorded by the OBC device surpasses the threshold of excessive baseline variation for the specific sensor; and sending a notification of the failing vehicular part from the OBC device to a personal computing device.

31. The method of determining a predictive failure for vehicular component as claimed in claim 1 comprises the steps of:

providing the primary dataset for each part sensor with a threshold of excessive baseline variation over a set number of after-initial trips;

recording the active performance-defined range of each part sensor for each after-initial trip with the OBC device;

identifying a failing vehicular part associated with a specific sensor from the plurality of part sensors, if a change in the active performance-defined range for the specific sensor over the set number of after-initial trips recorded by the OBC device surpasses the threshold of excessive baseline variation for the specific sensor; and sending a notification of the failing vehicular part from the OBC device to a personal computing device.

32. The method of determining a predictive failure for vehicular component as claimed in claim 1 comprises the steps of:

providing an intermission time period between the arbitrary trip and a subsequent trip while an ECU of the vehicle is inactive, wherein the subsequent trip is from the plurality of after-initial trips and succeeds the arbitrary trip;

collecting a plurality of maintenance time-dependent data (MTDD) points for a specific sensor from the plurality of part sensors by periodically activating the specific sensor throughout the intermission time period from the OBC device;

identifying an irregular MTDD point within the plurality of MTDD points for the specific sensor during the intermission time period, if the irregular MTDD point from the specific sensor is outside of the active performance-defined range of the specific sensor during the arbitrary trip; and sending a notification of the irregular MTDD point from the OBC device to a personal computing device.

* * * * *